United States Patent
Xin et al.

(10) Patent No.: US 11,963,224 B2
(45) Date of Patent: Apr. 16, 2024

(54) NON-ZERO RANDOM BACKOFF PROCEDURE

(71) Applicant: SONY GROUP CORPORATION, Tokyo (JP)

(72) Inventors: Liangxiao Xin, San Jose, CA (US); Mohamed Abouelseoud, San Francisco, CA (US); Li-Hsiang Sun, San Jose, CA (US); Qing Xia, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 229 days.

(21) Appl. No.: 17/509,015

(22) Filed: Oct. 24, 2021

(65) Prior Publication Data

US 2022/0322438 A1    Oct. 6, 2022

Related U.S. Application Data

(60) Provisional application No. 63/168,449, filed on Mar. 31, 2021.

(51) Int. Cl.
*H04W 84/12* (2009.01)
*H04W 74/0816* (2024.01)

(52) U.S. Cl.
CPC ........ *H04W 74/0816* (2013.01); *H04W 84/12* (2013.01)

(58) Field of Classification Search
CPC .... H04W 74/0816; H04W 84/12; H04L 12/28
USPC ........................ 370/329, 400, 403
See application file for complete search history.

(56) References Cited

U.S. PATENT DOCUMENTS

| | | | |
|---|---|---|---|
| 9,736,871 B2 * | 8/2017 | Kim | ...................... H04W 72/23 |
| 2007/0263654 A1 | 11/2007 | Salokannel | |
| 2013/0279426 A1 | 10/2013 | Wentink | |

(Continued)

FOREIGN PATENT DOCUMENTS

| | | |
|---|---|---|
| GB | 2562601 B | 11/2019 |
| WO | 2018014713 A1 | 1/2018 |

OTHER PUBLICATIONS

Gu D et al: "QOS Enhancement in IEEE802.II Wireless LOC;IAREA Networks", IEEE Communications Magazine, IEEE Service Center, Piscataway, US, vol. 41, No. 6, Jun. 1, 2003 (Jun. 1, 2003), pp. 120-124, XP001163853, ISSN: 0163-6804 p. 121-p. 123.

*Primary Examiner* — Dang T Ton
(74) *Attorney, Agent, or Firm* — O'BANION & RITCHEY LLP; John P. O'Banion

(57) ABSTRACT

A wireless local area network (WLAN) protocol having a non-zero backoff procedure which is bounded by setting a backoff counter to a random value greater than or equal to at least one backoff slot in starting to contend for a channel. This is preferably utilized in combination with setting the Arbitration Inter-Frame Spacing (AIFS) time to an amount less than that utilized for a legacy backoff. The parameters controlling the non-zero backoff may be set by the station performing the contention, or by an associated Access Point (AP), or in response to negotiation between the station and the AP. In some cases the station can switch between enabling and disabling the non-zero backoff procedure during different periods of time.

46 Claims, 20 Drawing Sheets

(56) References Cited

U.S. PATENT DOCUMENTS

2016/0157218 A1\* 6/2016 Nam .................... H04B 7/0632
                                                        370/329
2018/0167976 A1   6/2018 Wentink
2021/0022135 A1   1/2021 Peng \* cited by examiner

FIG. 2 (Prior Art)

Data frame: | Frame Control | Duration | RA | TA | Sequence Control | Data | FCS |

FIG. 3 (Prior Art)

ACK frame: | Frame Control | Duration | RA | FCS |

FIG. 4 (Prior Art)

HE-SU: | L-STF (8μs) | L-LTF (8μs) | L-SIG (4μs) | RL-SIG (4μs) | HE-SIG-A (8μs) | HE-STF (4μs) | HE-LTFs | Data | PE |

| Element ID | Length | QoS Info | Updated EDCA Info | AC_BE Parameter Record | AC_BK Parameter Record | AC_VI Parameter Record | AC_VO Parameter Record |
|---|---|---|---|---|---|---|---|

**FIG. 9
(Prior Art)**

| EDCA Parameter Set Update Count | Q-Ack | Queue Request | TXOP Request | Reserved |
|---|---|---|---|---|

**FIG. 10
(Prior Art)**

| AC/ AIFSN | ECWmin/ ECWmax | TXOP Limit |
|---|---|---|

**FIG. 11
(Prior Art)**

NON-ZERO RANDOM BACKOFF PROCEDURE

CROSS-REFERENCE TO RELATED APPLICATIONS

This application claims priority to, and the benefit of, U.S. provisional patent application Ser. No. 63/168,449 filed on Mar. 31, 2021, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to channel contention procedures on a wireless network using CSMA/CA procedures, and more particularly to channel contention procedures which provide a bounded contention time when accessing the channel.

2. Background Discussion

Current wireless technologies using CSMA/CA focus on high throughput performance of the network but are lacking in regard to supporting low latency applications, such as real time applications (RTA), which require low latency and use best effort communication. The data generated from the RTA is referred to herein as RTA traffic and is packetized as RTA packets at the transmitter STA; while data generated from non-time sensitive applications are referred to herein as non-RTA traffic and are packetized as non-RTA packets at the transmitter STA. The RTA packets require low latency due to their high timeliness requirement of packet delivery, with the RTA packet data remaining valid only within a certain period of time.

However, there are often unnecessary tradeoffs on existing systems in regard to prioritizing RTS packet traffic.

Accordingly, a need exists for improved mechanisms for performing channel contention which are more suited to real time applications, without significant compromises on throughput for conventional traffic.

BRIEF SUMMARY

In current (legacy) wireless communication systems a random backoff procedure can result in accessing the channel without decrementing any backoff slots, which leads to a contention time (the time for one backoff procedure) which is not bounded, and thus unsuitable for transmissions which require bounded latency.

A non-zero backoff procedure is described for ensuring that the backoff counter must be decremented at least once between two CCA busy events during a backoff procedure. Thus, the contention time of an AC can be bounded by (CWmax+1)*TXOP_limit where CWmax is the max contention window size of that AC and TXOP_limit is the max TXOP limit for all the ACs. The non-zero backoff procedure is preferably utilized in conjunction with setting a short Arbitration Inter-Frame Spacing (AIFS) time (also referred to as AIFS Number (AIFSN)) for an AC to give the non-zero backoff procedure of that AC higher priority compared with the legacy backoff procedure of the same AC.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 2 is a data field diagram of a data frame as defined in IEEE 802.11.

FIG. 3 is a data field diagram of an ACK frame format as defined in IEEE 802.11.

FIG. 4 is a data field diagram of a HE single user (SU) PPDU format as defined in IEEE 802.11.

FIG. 9 is a data field diagram of the format for an EDCA parameter set element as defined in IEEE 802.11.

FIG. 10 is a data field diagram of a QoS Info field when sent by an AP as defined in IEEE 802.11.

FIG. 11 is a data field diagram of the format for AC Parameter Record fields as defined in IEEE 802.11.

DETAILED DESCRIPTION

1. Introduction

The RTA packet requires low latency due to its high timeliness requirement on packet delivery. The RTA packet is valid when it is delivered within a certain period of time. Certain RTA packet traffic also is benefited by (or requires) a bounded (more predictable) channel contention time that provided by a CSMA/CA wireless system.

In the random channel access scenario of CSMA/CA each STA needs to sense and contend for channel access before transmitting each packet. Though a short channel contention time accelerates channel access, it does not provide bounded channel access time. The delay caused by channel contention is still significant and unpredictable.

A process is described which bounds the delay caused by channel contention by utilizing a non-zero (NZ) backoff procedure which can be beneficial for RTA packets. The disclosed non-zero backoff procedure can guarantee a bounded time for STAs to complete channel contention. Moreover, the non-zero backoff procedure obtains a higher probability to gain an earlier channel access than the legacy backoff procedure, assuming their EDCA parameters are the same except that the Arbitration Inter-Frame Spacing (AIFS), of the non-zero backoff procedure is shorter than the AIFS of the legacy backoff procedure.

2. WLAN 802.11 Systems 2.1. CMSA/CA Systems

Figure 1:
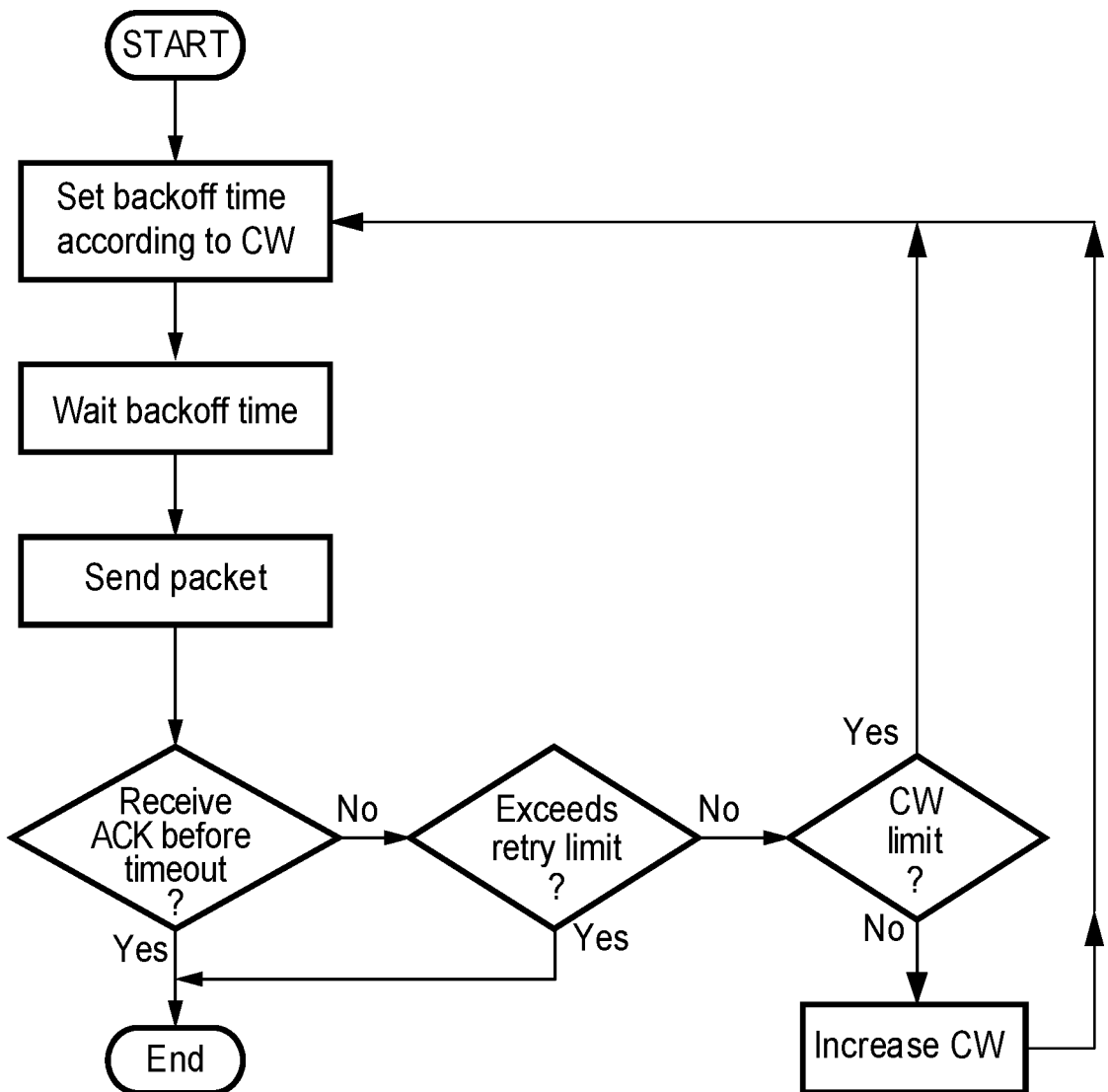
FIG. 1 is a flow diagram of a WLAN system using Carrier Sense Multiple Access/Collision Avoidance (CSMA/CA) under IEEE 802.11.

FIG. 1 depicts a WLAN system under IEEE 802.11 using Carrier Sense Multiple Access/Collision Avoidance (CSMA/CA) to allow stations (STAs) to obtain channel access for packet transmissions and retransmissions.

In a CSMA/CA system, before each transmission and retransmission, the STA must sense the channel and set a backoff time in order to contend for channel access. The backoff time is decided by a uniform random variable between zero and the size of contention window (CW). After the STA waits for the backoff time and senses that the channel is idle, it proceeds to transmit (send) a packet.

A retransmission may be required if the STA does not receive an ACK before timeout; otherwise the transmission succeeds. When a retransmission is required, the STA checks the number of retransmissions of the packet. If the number of retransmissions exceeds the retry limit, then the packet is dropped and no retransmissions are scheduled. Otherwise, the retransmissions are scheduled.

If the retransmission is scheduled, then another backoff time is needed to contend for retransmission channel access. If the size of the contention window has not reach an upper limit, then the STA increases it.

The STA sets another backoff time depending on the new size of the contention window. The STA waits the backoff time for retransmission and continues forward in that manner.

FIG. 2 illustrates the data frame format in a regular WLAN system. A Frame Control field indicates the type of frame. A Duration field contains NAV information used for CSMA/CA channel access. An RA field contains an address for the recipient of the frame. A TA field contains the address for the STA that transmitted the frame. A Sequence control field contains the fragment number and the sequence number of a packet. An HT control field indicates extra control information for the frames.

FIG. 3 illustrates the ACK frame format in regular WLAN system. A Frame Control field indicates the type of frame. A Duration field contains NAV information used for CSMA/CA channel access. An RA field contains an address for the recipient of the frame.

FIG. 4 shows the HE single user (SU) PPDU format used for single user transmission in IEEE 802.11ax which contains the following fields.

An L-STF field provides a non-HT short training field. An L-LTF field provides a non-HT long training field. An L-SIG field provides a non-HT SIGNAL field. An RL-SIG field provides a repeated non-HT SIGNAL field. An HE-SIG-A field provides an HE SIGNAL A field. An HE-STF field provides an HE short training field. An HE-LTF field provides an HE long training field. A Data field is the field carrying PHY layer convergence protocol Service Data Units (PSDUs). A PE field is a packet extension field.

Figure 5:
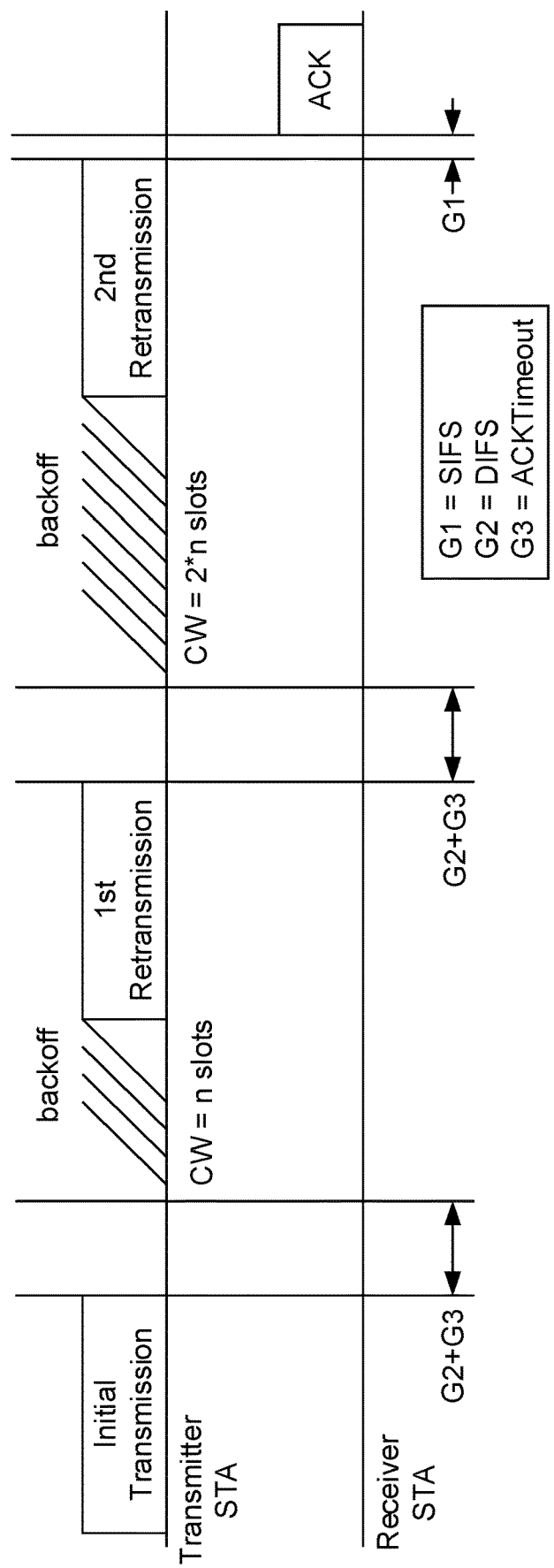
FIG. 5 is a communications diagram of retransmission in CSMA/CA where the backoff time is increased due to retransmission in IEEE 802.11.

FIG. 5 illustrates one example of retransmission in CSMA/CA where the backoff time is increased in response to performing retransmission. The data frame and the ACK frame use formats as shown in FIG. 2 and FIG. 3, respectively. The frames are packetized using the packet format as shown in FIG. 4. In this example, after the transmitter transmits the initial transmission of a packet, it does not receive the ACK before the ACK timeout. Then, for a retransmission it sets another backoff time in which the size of the contention window is n slots. After waiting the backoff time, the transmitter STA retransmits the packet for the first time. However, the retransmission also fails. The transmitter STA needs to retransmit the packet and sets another backoff time to contend for channel access. This time, the size of the contention window is doubled, which is 2*n slots, due to the retransmission. The expected backoff time is also doubled by the contention window size. The second retransmission succeeds since it receives an ACK before timeout.

Figure 6:
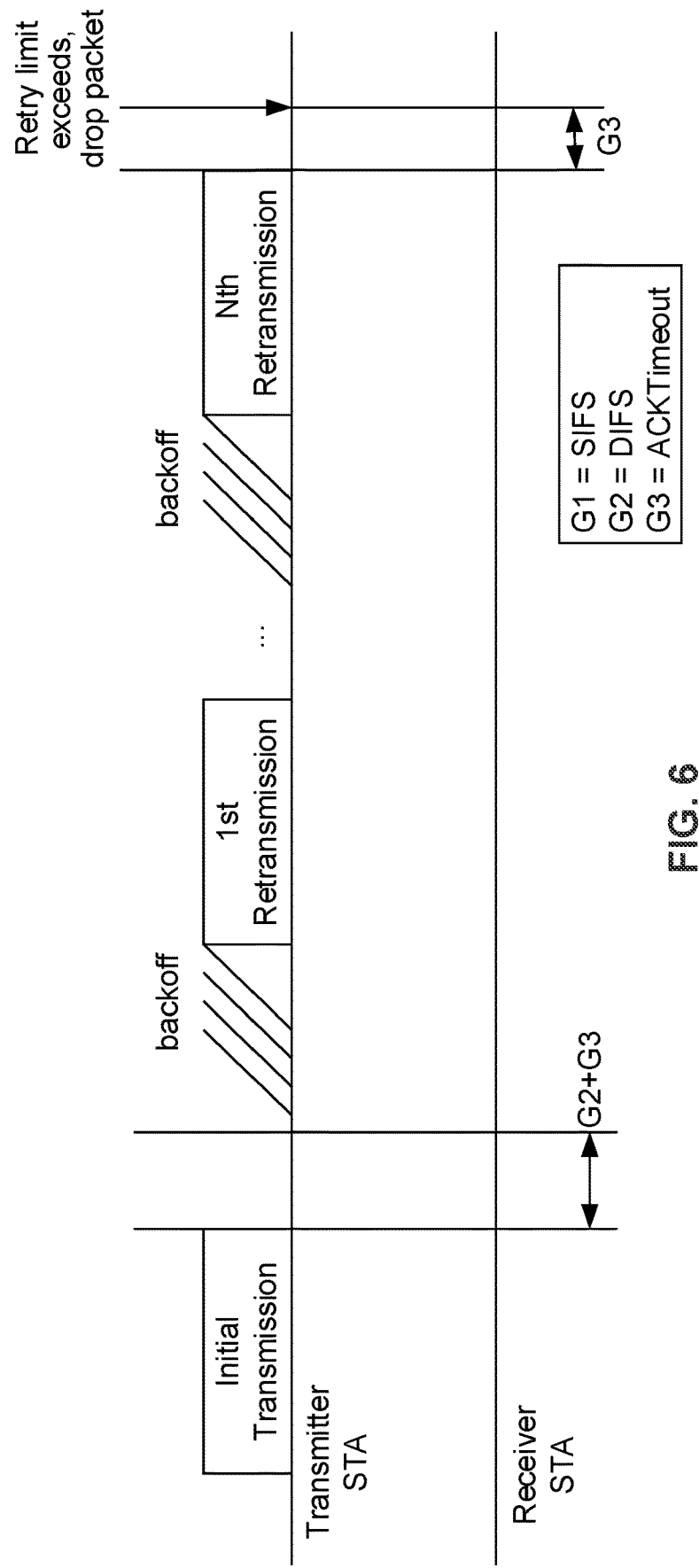
FIG. 6 is a communications diagram in which a packet is dropped after the number of retransmission exceeds the retry limit in IEEE 802.11.

FIG. 6 illustrates one example in which the packet is dropped after the number of retransmissions exceeds the retry limit. In this example the retry limit is denoted by "R". The data frame and the ACK frame use the formats as shown in FIG. 2 and FIG. 3, respectively. The frames are packetized using the packet format as shown in FIG. 4. As shown in FIG. 6, after the initial transmission of a packet fails, the transmitter STA retransmits that packet multiple times. However, none of the retransmissions succeed. After retransmitting R times, the number of retransmissions exceeds the retry limit, and the transmitter STA stops retransmitting that packet and the packet is dropped.

2.2. EDCA Queues in 802.11

Figure 7:
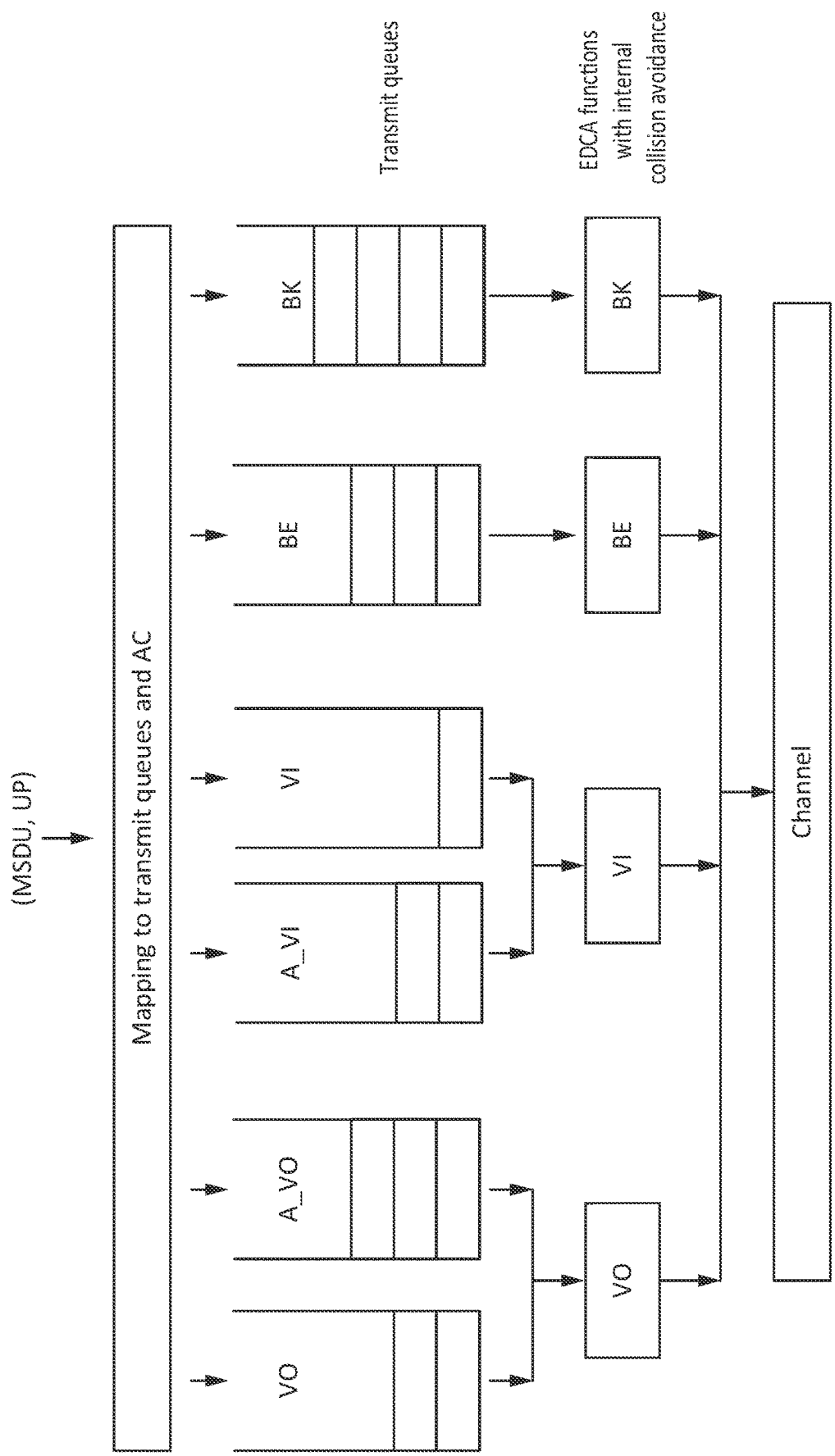
FIG. 7 is a queue diagram of an EDCA queue showing ACs and EDCA functions as defined in IEEE 802.11.

FIG. 7 illustrates the reference model of the Enhanced DCF Channel Access (EDCA) queue in IEEE 802.11; where DCF stands for Distributed Coordination Function. The system contains six transmit queues and four access categories (ACs). Each AC uses EDCA functions (EDCAFs) to contend for channel access for transmitting packets from its corresponding transmit queues, which is an enhanced variant of the DCF.

The six transmit queues are voice (VO), alternate voice (A_VO), alternate video (A_VI), video (VI), best effort (BE), and background (BK). Each transmit queue decides the transmission order of the packets in the queue.

The four ACs are voice (VO), video (VI), best effort (BE), and background (BK). Each AC has an EDCA function (EDCAF) to provide the function of channel contention. An internal collision avoidance mechanism is used when multiple EDCAFs try to access the channel at the same time. When the internal collision occurs, the EDCAF with higher priority will gain channel access.

Table 1 lists the User Priority (UP) to Access Class (AC) mapping used in EDCA queue of IEEE 802.11. The second and third columns represent the user priorities of the traffic and their corresponding designations in IEEE 802.1D. In each row, according to user priority, the traffic will be enqueued in the corresponding transmit queue and access category. The priority increases from the top row to the bottom row. The traffic with higher priority has higher probability to be transmitted earlier.

Figure 8:
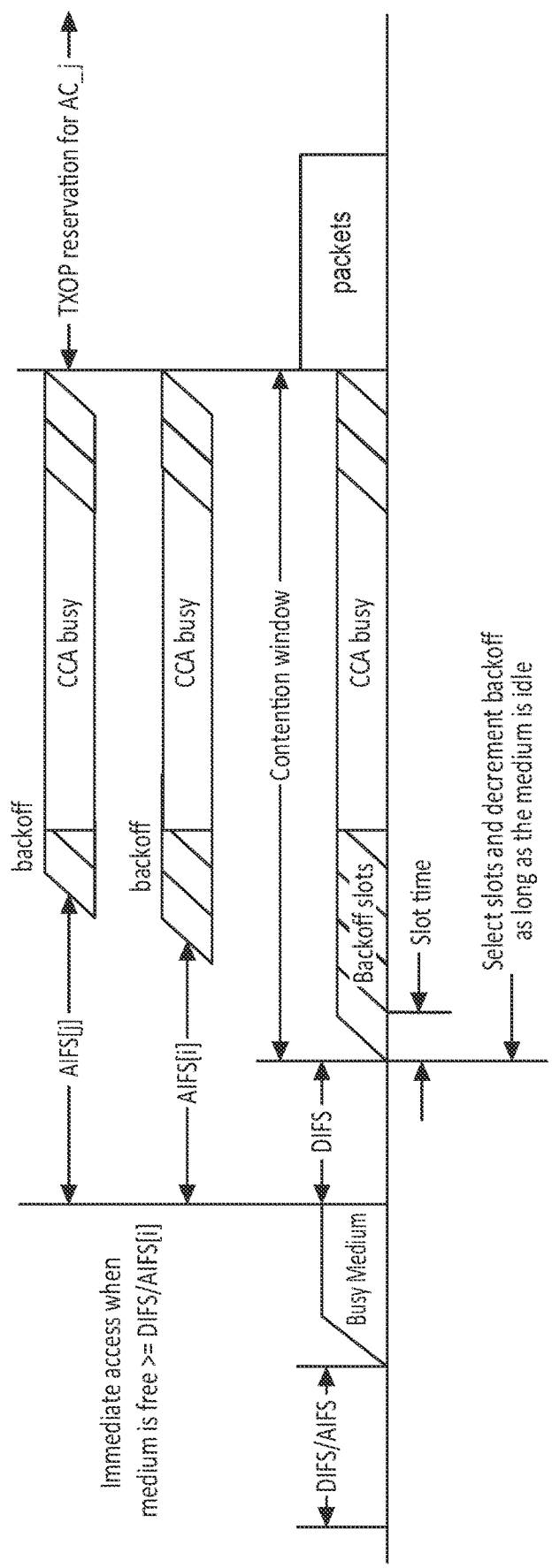
FIG. 8 is a communications diagram of a channel access procedure for EDCA as defined in IEEE 802.11.

FIG. 8 illustrates a channel access procedure for EDCA. As shown in the figure, it also compares EDCA channel access with the Distributed Coordination Function (DCF).

DCF is the basic medium access protocol for IEEE 802.11 which employs the CSMA/CA with exponential backoff algorithm. For the DCF, when the STA determines that the medium is idle at the time that a frame arrives at an empty queue for transmission, the STA is able to immediately access the channel and the medium is free for a DCF Interframe Space (DIFS) time. Otherwise, it follows the backoff procedure to contend for the channel. After sensing channel idle for DIFS time, it starts to count down backoff as long as the medium is idle. The number of backoff slots is randomly chosen between zero and its contention window. The STA pauses to count down the backoff when CCA busy (or medium busy) occurs, i.e., when the STA senses the channel is busy. When the backoff counts down to zero, the STA starts to transmit packets.

It should be appreciated that DCF is a CSMA/CA with exponential backoff algorithm and EDCA is implemented based on DCF. In the reference from the current IEEE 802.11 revision standard 11REVmd D5.0, it indicates that "The fundamental access method of the MAC used by non-DMG STAs is a DCF known as carrier sense multiple access with collision avoidance (CSMA/CA). The DCF shall be implemented in all STAs. The EDCA channel access protocol is derived from the DCF procedures described in 10.3 (DCF) by adding four independent enhanced distributed channel access functions (EDCAFs) to provide differentiated priorities to transmitted traffic, through the use of four different access categories (ACs)."

In EDCA, the EDCAF of an AC as shown in FIG. 7 is able to immediately access the channel and the medium is free for the arbitration Inter-Frame Spacing (AIFS) time (or number) of that AC when the EDCAF determines that the medium is idle at the time that a frame arrives at the empty queue of that AC for transmission. It will be noted that AIFS[i] as shown in the figure represents the AIFS time for AC i; where "i" denotes any of the ACs. Otherwise, each EDCAF follows the backoff procedure to contend for the channel and gain channel access for that AC. After sensing the channel is idle for AIFS time, it starts to count down a backoff as long as the medium is idle. The number of backoff slots is randomly chosen between zero and the contention window size of that AC. The EDCAF pauses to count down the backoff when Clear Channel Assessment (CCA) busy (or medium busy) occurs, i.e., when the channel is sensed busy. When the backoff of the EDCAF counts down to zero, the STA starts to transmit packets for that AC.

It should be appreciated that multiple EDCAFs can contend for the channel in parallel. For example, EDCAFs for AC i and AC j (both i and j represent any of the ACs) can contend for the channel at the same time as shown in FIG. 8. When the internal collision occurs, the EDCAF with higher priority gains channel access and the EDCAF with lower priority doubles its contention window. An AC is able to reserve a period of contention free time, for example a TX Opportunity (TXOP) for transmitting packets. The maximum duration of TXOP is denoted as the TXOP limit.

Table 2 lists the default parameter setting for EDCA channel access. Each AC has its own minimum contention window and maximum contention window. AIFS Number (AIFSN) represents the AIFS duration in terms of the number of backoff slots, and is also referred to herein as AIFS time. The TXOP limit represents the maximum duration of TXOP that each AC can reserve each time except for when the TXOP limit is set to zero. When the TXOP limit is set to zero, a STA can't reserve TXOP for multiple packet transmissions.

2.3. EDCA Parameter Set Element

The AP can transmit or broadcast a frame including an EDCA parameter set element to set the EDCA parameters on its associated STAs.

FIG. 9 illustrates the format of an EDCA parameter set element defined in IEEE 802.11. An Element ID field contains an identification of the element indicating in this example that this element is an EDCA parameter set element. A Length field indicates the length of the element. A QoS Info field is defined in IEEE 802.11 as shown in FIG. 10. An Updated EDCA Info field is defined in IEEE 802.11 and reserved for non-S1G STA. An AC_BE Parameter Record field carries the EDCA parameters of AC_BE. The format of this subfield and the following subfields is shown in FIG. 11. An AC_BK Parameter Record field carries the EDCA parameters of AC_BK. An AC_VI Parameter Record field carries the EDCA parameters of AC_VI. An AC_VO Parameter Record field carries the EDCA parameters of AC_VO.

FIG. 10 illustrates the format of the QoS Info field when sent by the AP as defined in IEEE 802.11. An EDCA Parameter Set Update Count field indicates the version of the EDCA parameter set. If the non-AP STA receives this with a different value that what it has stored, then the STA should update the EDCA parameters according to the recently received EDCA parameter element. A Q-ACK field is set to a first state (e.g., "1") when dot11QAckOptionImplemented is true and is set to 0 otherwise. A Queue Request field is set to a first state (e.g., "1") if APs can process a non-zero queue size subfield in the QoS control field of the QoS data frames and is set to a second state (e.g., "0") otherwise. A TXOP Request field is set to a first state (e.g., "1") if APs can process a non-zero TXOP Duration requested subfield in the QoS control field of QoS data frames and is set to a second state (e.g., "0") otherwise.

FIG. 11 illustrates the format of AC_X (e.g., AC_VO, AC_VI, AC_BE, AC_BK) Parameter Record field as defined in IEEE 802.11. An AC/AIFSN field indicates the access category (AC) of this field and the parameter set of the AIFSN. An ECWmin/ECWmax field indicates the minimum contention window (CW) size and maximum CW size of the AC. A TXOP limit field indicates the TXOP limit of the AC.

3. Problem Statement

Previous to this disclosure, wireless communication systems using 802.11 using random backoff procedure can access the channel without decrementing any backoff slots. Therefore, it is possible that during a backoff procedure of a STA, its backoff counter does not decrease between two successive CCA busy events if the second CCA busy is caused by another STA accessing the channel without decrementing any backoff slots. As a result, the contention time (the time for one backoff procedure) is not bounded (it is unconstrained). This type of operation is not suitable for transmissions which require a bounded latency.

4. Contributions of the Present Disclosure

The disclosed technology describes a non-zero (NZ) backoff procedure to ensure the backoff counter is set (initialized) to at least one count. For example, the backoff counter is set to a random number between 1 and CW+1. It should be noted that the legacy backoff procedure can initialize its backoff counter to zero since the backoff counter is randomly chosen between 0 and CW. If all STAs use a non-zero backoff procedure, then the backoff counter of a STA must decrease by at least one count between two CCA busy events. In that case, the time for counting down the backoff counter to zero for a STA, when using non-zero backoff procedure, is bounded by (CWmax+1)*TXOP_limit where CWmax is the maximum contention window size of the backoff procedure and TXOP_limit is the maximum contention-free channel time that a STA can reserve for transmission after it gains channel access. When this non-zero backoff procedure is used by the EDCAF of an AC in EDCA, it is preferably utilized with a shorter AIFS time (smaller AIFSN) so that the non-zero backoff procedure is given a higher priority compared with legacy backoff procedure with the same CW.

5. Embodiments

5.1. STA and MLD Hardware Configuration

Figure 12:
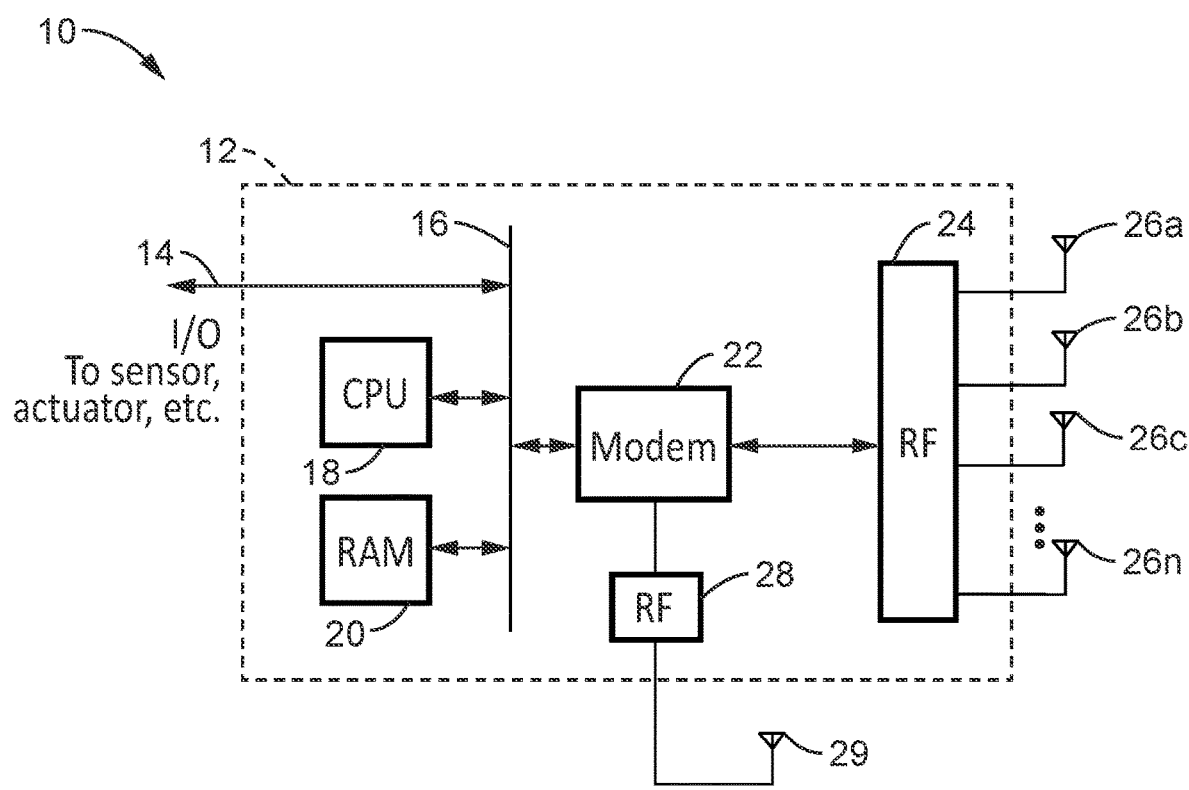
FIG. 12 is a hardware block diagram of wireless station hardware according to at least one embodiment of the present disclosure.

FIG. 12 illustrates an example embodiment 10 of a wireless station (STA) configured for executing the protocol of the present disclosure. An external I/O connection 14 preferably couples to an internal bus 16 upon which are connected a CPU 18 and memory (e.g., RAM) 20 for executing a program(s) which implement the communication protocol. The host machine accommodates at least one modem 22 to support communications coupled to at least one RF module 24, 28 each connected to one or multiple antennas 29, 26a, 26b, 26c through 26n. An RF module with multiple antennas (e.g., antenna array) allows for performing beamforming during transmission and reception. In this way, the STA can transmit signals using multiple sets of beam patterns.

Bus 14 allows connecting various devices to the CPU, such as to sensors, actuators and so forth. Instructions from memory 20 are executed on processor 18 to execute a program which implements the communications protocol, which is executed to allow the STA to perform in different roles on the network, such as that of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with other AP, coordinator, coordinatee and so forth), depending on what role it is performing in the current communications context.

Thus, the STA hardware is shown configured with at least one modem, and associated RF circuitry for providing communication on at least one band. This may be any desired combination of sub-6 GHz bands and directional bands. At least one embodiment of the present disclosure is configured for using the sub-6 GHz band.

It should be appreciated that the present disclosure can be configured with multiple modems 22, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

In addition, it will be noted that multiple instances of the station hardware as shown in the figure, can be combined in various ways into a multi-link device (MLD), which typically will have a processor and memory for coordinating activity, there is not always a need for a separate CPU and memory for each STA within the MLD.

Figure 13:
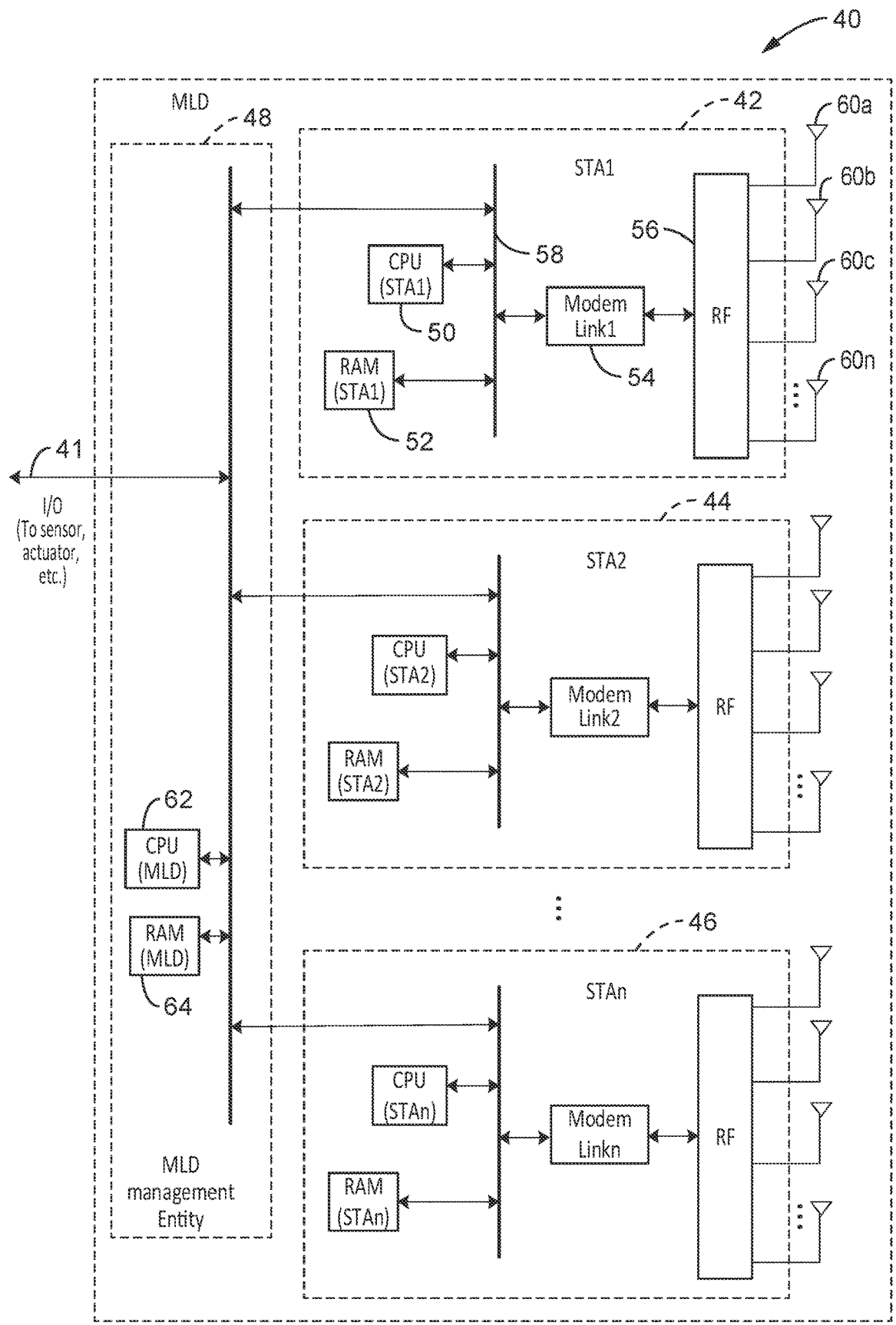
FIG. 13 is a hardware block diagram of a Multi-Link Device according to at least one embodiment of the present disclosure.

FIG. 13 illustrates an example embodiment 40 of a Multi-Link Device (MLD) hardware configuration. Multiple STAs are affiliated with an MLD, with each STA operating on a link of a different frequency. The MLD has external I/O 41 access to applications, this access connects to a MLD management entity 48 having a CPU 62 and memory (e.g., RAM) 64 to allow executing a program(s) that implements communication protocols at the MLD level. The MLD can distribute tasks to, and collect information from, each affiliated station to which it is connected, exemplified here as STA 1 42, STA 2 44 through to STA N 46 and share information between affiliated STAs.

In at least one embodiment, each STA of the MLD has its own CPU 50 and memory (RAM) 52, which is generally coupled through a bus 58 to at least one modem 54 which is connected to at least one RF circuit 56 which has one or more antennas. In the present example the RF circuit has multiple antennas 60*a*, 60*b*, 60*c* through 60*n*, such as in an antenna array. The modem in combination with the RF circuit and associated antenna(s) transmit/receive data frames with neighboring STAs. In at least one implementation, the RF module includes frequency converter, array antenna controller, and other circuits for interfacing with its antennas.

It should be appreciated that each STA of the MLD does not necessarily require its own processor and memory, as the STAs may share resources with one another and/or with the MLD management entity, depending on the specific MLD implementation. It should be appreciated that the above MLD diagram is given by way of example and not limitation, whereas the present disclosure can operate with a wide range of MLD implementations.

5.2. STA Topology for Consideration

Figure 14:
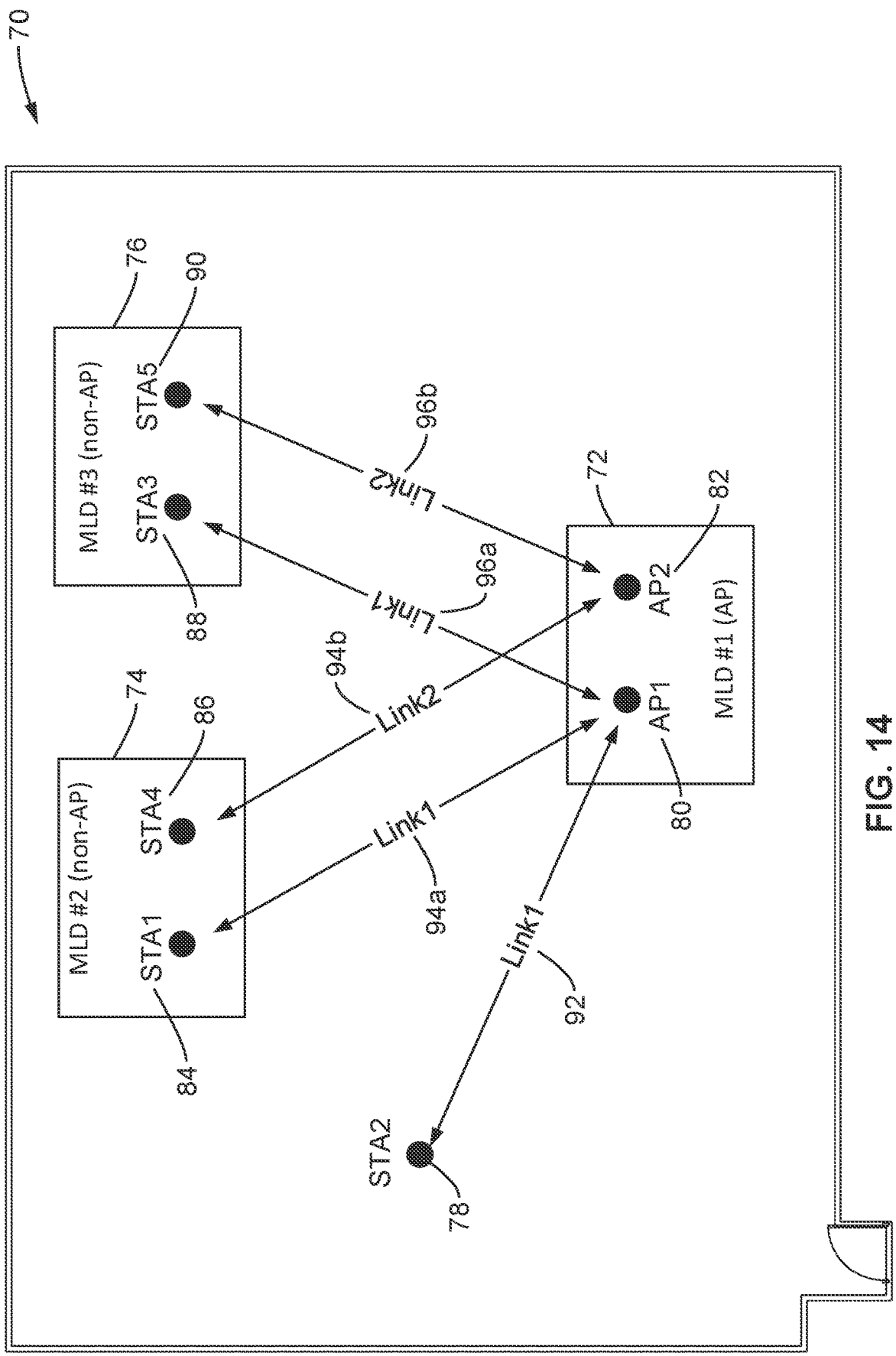
FIG. 14 is a topology of a network scenario utilized by way of example and not limitation according to at least one example of the present disclosure.

FIG. 14 illustrates an example embodiment 70 of a topology (network scenario), given by way of example and not limitation. The topology is provided solely to explain the goals of the proposed technology, not to limit it to a specific STA configuration.

An MLD is considered an AP MLD if APs are affiliated with that MLD. An MLD is considered a non-AP MLD if non-AP STAs are affiliated with that MLD.

The example topology of FIG. 14 assumes there are 6 STAs consisting 3 MLDs in a given area (e.g., meeting room). AP1 80 and AP2 82 are affiliated with multi-link device (MLD) #1 72, STA1 84 and STA4 86 are affiliated with MLD #2 74, and STA3 88 and STA5 90 are affiliated with MLD #3 76. STA2 78 can exemplify a non-AP STA operating on Link1 92 or a single link MLD (i.e., a special MLD which only has one STA and operates on one link). STA1, STA2, and STA3 are associated with AP1 over Link1 92, 94*a* and 96*a*; and STA4 and STA5 are associated with AP2 over Link2 94*b* and 96*b*. In these examples, all STAs use EDCA for random channel access on all links.

5.3. Non-zero Backoff Procedure

A non-zero backoff procedure is a backoff procedure in which a STA has to generate a random backoff with a count greater than or equal to 1 (backoff slots) to initialize the backoff counter for channel contention. Then, the STA can count down the backoff counter the same as it does in CSMA/CA. It is also possible that the CW can be updated as in the CSMA/CA.

When a non-zero backoff procedure is used by DCF or EDCA, it is possible that the STA is not able to use the immediate access of DCF or EDCA as shown in FIG. 8.

The current backoff procedure used in CSMA/CA (such as DCF and EDCA) is denoted as a legacy backoff procedure, as it does not support the described non-zero backoff procedure.

5.3.1. Flowcharts of Example Protocol Procedures

Figure 15:
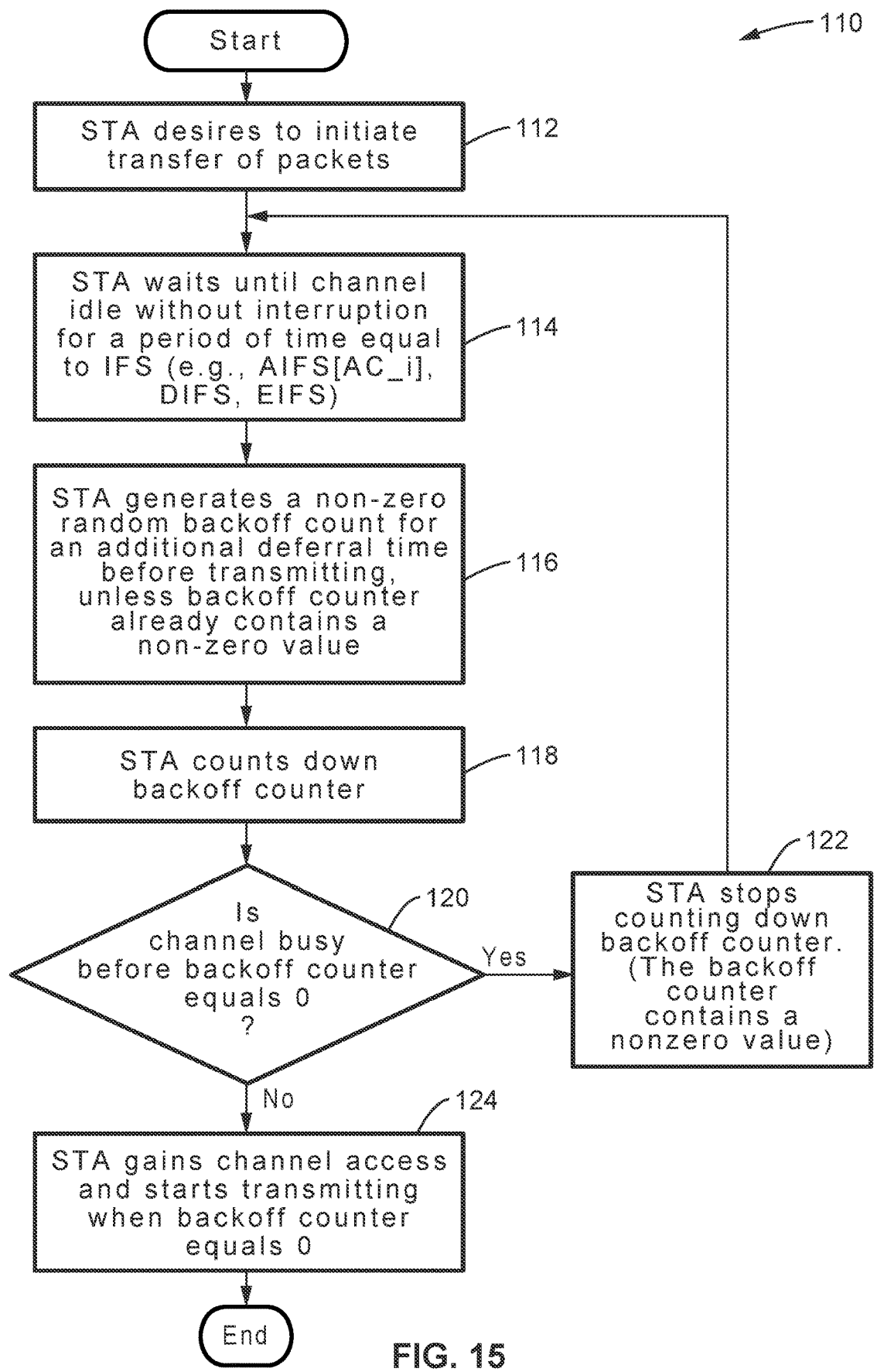
FIG. 15 is a flow diagram of a non-zero backoff procedure according to at least one example of the present disclosure.

FIG. 15 illustrates an example embodiment 110 of a non-zero backoff procedure. When a STA intends to initiate 112 the transfer of one or more frames, it waits 114 until the medium/channel is idle without interruption for a period of time equal to IFS, such as DIFS, AIFS[AC_i] (AIFS when the STA contends for a channel for AC_i), EIFS as defined in IEEE 802.11. The STA may apply those different types of IFSs according to the rule defined in IEEE 802.11. It is also possible that the STA uses either DIFS or AIFS[AC_i] only.

After the IFS channel/medium idle time, the STA generates 116 a non-zero random backoff count (i.e., the number of backoff slots) for an additional deferral time before transmitting. That is, Backoff Count is greater or equal to one. The following are given by way of example of different backoff count generation methods.

Backoff Count=Random( ) where Random( )=Pseudorandom integer drawn from a uniform distribution over the interval [1, CW+1], where CW is the contention window size.

Backoff Count=Random( ) where Random( )=Pseudorandom integer drawn from a uniform distribution over the interval [1, CW], where CW is the contention window size.

Backoff Count=Random( ) where Random( )=Pseudorandom integer drawn from a uniform distribution over the interval [m, n], where m and n are integers, and n is greater than m, which is greater than or equal to 1.

Then, after setting the backoff count, the STA counts down 118 the backoff counter. A check 120 determines if the medium/channel becomes busy before the backoff counter reaches a terminal count (e.g., 0). If it has become busy, then at block 122 it stops counting down the backoff counter and returns to block 114 where the STA waits until the medium/channel is idle without interruption for a period of time equal to IFS; then the STA continues counting down the backoff counter. It should be noted that since the backoff counter contains a non-zero value, the STA does not generate a new random backoff count after waiting for the IFS time.

If at block 120 it is determined the channel is not busy, then at block 124 the STA gains channel access and starts transmitting when the backoff counter equals zero.

5.3.2. Example Backoff

Figure 16:
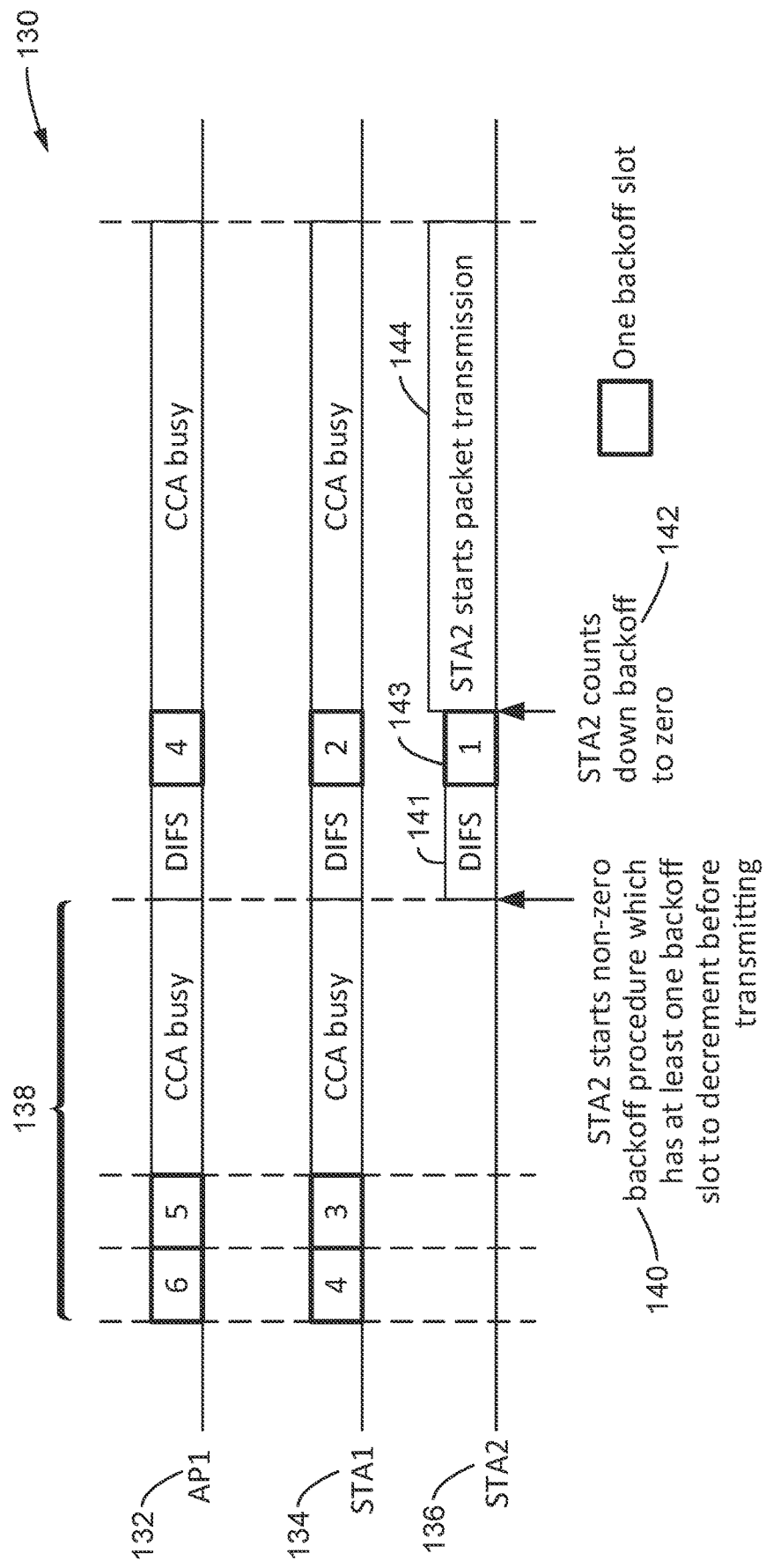
FIG. 16 is a communications diagram of a STA using non-zero backoff procedure for channel contention according to at least one example of the present disclosure.

FIG. 16 illustrates an example embodiment 130 of a STA using a non-zero backoff procedure in DCF for channel contention. The network topology is shown in FIG. 14, with interactions here between AP1 132, STA1 134 and STA2 136.

In the example, STA1 and AP1 are performing a legacy backoff as defined in DCF of IEEE 802.11 138. STA2 starts non-zero backoff procedure 140. It first waits a DIFS time 141 and sets the backoff counter equal to 1 143. When the backoff counter counts down to zero 142, STA2 accesses the channel and starts packet transmission 144.

It should be noted that when STA2 contends for the channel for an AC of EDCA, the DIFS time shown in the figure should be replaced by an AIFS time for that AC.

Figure 17:
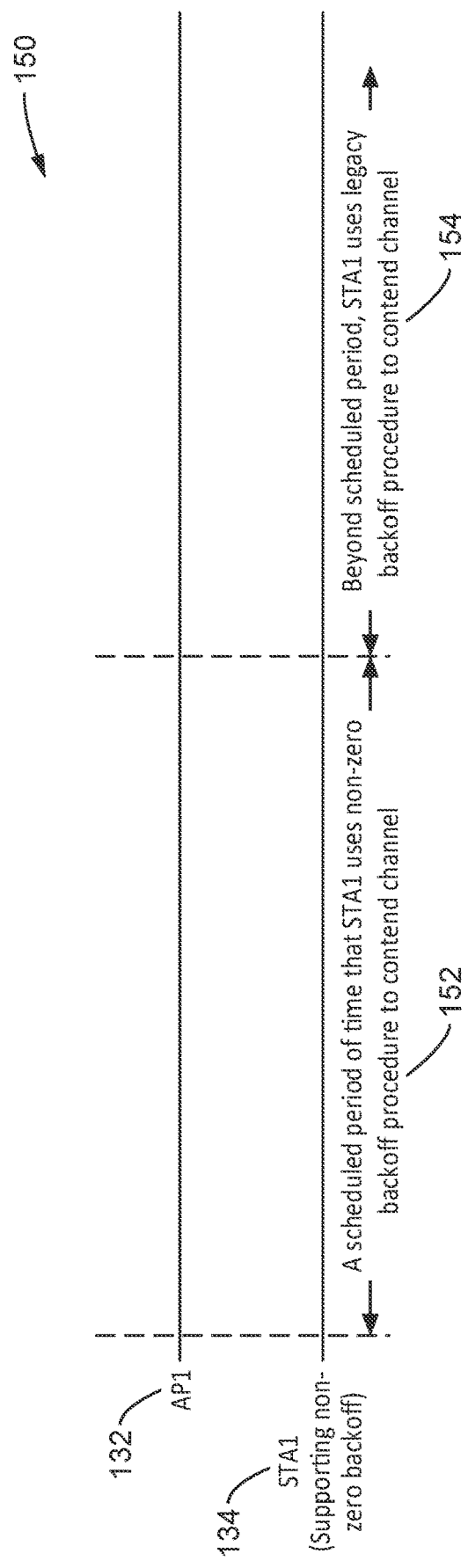
FIG. 17 is a communications diagram of a STA enabling and disabling non-zero backoff procedures for channel contention during different period of time according to at least one example of the present disclosure.

FIG. 17 illustrates an example embodiment 150 of a STA enabling and disabling a non-zero backoff procedure for channel contention by time. The network topology is shown in FIG. 14. In the example, STA1 134 and AP1 132 are depicted. STA1 uses a non-zero backoff procedure 134 during a scheduled period of time 152. This scheduled period of time could be determined by the STA, negotiated between the AP and STA, or allocated by the AP. For example, a scheduled period of time could be a restricted Target Wake Time (TWT) service period (SP) or scheduled period of HCF Controlled Channel Access (HCCA) in IEEE 802.11be. Beyond the scheduled period, STA1 disables 154 the non-zero backoff procedure and uses a legacy backoff procedure as explained in a previous section for channel contention.

It will be noted that when STA1 uses a non-zero backoff procedure in an EDCAF, it can also use an AIFS whose time is different from that of the legacy backoff procedure. For example, for AC_VO, when STA1 uses non-zero backoff procedure, it can set the AIFSN of AC_VO to 1. When STA1 uses a legacy backoff procedure, it can set the AIFSN of AC_VO to 2

5.4. Coexistence of Non-zero Backoff and Legacy Backoff

This section considers the scenario when the STAs supporting non-zero backoff procedure and the STAs not supporting non-zero backoff procedure coexist.

The current backoff procedure used in IEEE 802.11 is denoted as a legacy backoff procedure. The STA not supporting non-zero backoff procedure is denoted as a legacy STA.

One purpose of the disclosed technologies is to make the non-zero backoff procedure to provide a higher priority than the legacy backoff procedure. In order to achieve this purpose, for the same AC, the non-zero backoff procedure can use a shorter AIFS time than the legacy backoff procedure. For example, for AC_VO, a STA using a non-zero backoff procedure for AC VO can set the AIFSN of AC_VO to 1, while another STA using legacy backoff procedure for AC VO can set the AIFSN of AC_VO to 2. In at least one embodiment, the STA only reduces the AIFS time for an AC without using the non-zero backoff procedure to increase its priority.

It will be noted that the AIFS time should be greater, or equal to, the Point Coordination Function Interframe Space (PIFS) time to ensure the error recovery procedure for retransmissions can access the channel faster. For example, if AIFSN of AC_VO is set to 1 when using a non-zero backoff procedure, the AIFS time of AC_VO when using non-zero backoff procedure is equal to the PIFS time. Since the number of backoff slots is not zero, an AIFS time plus at least one backoff slot time will be always longer than a PIFS time. That is, the recovery procedure for retransmissions can access the channel faster than the non-zero backoff procedure.

5.4.1. EDCA Parameter Setting for Non-zero Backoff

The two examples for the disclosed technology are provided for setting the EDCA parameters for the non-zero backoff procedure.

5.4.1.1. Reuse EDCA parameter set element for non-zero backoff

In an IEEE 802.11 network, an AP can send a frame including an EDCA parameter set element as shown in FIG. 9 to set the EDCA parameters of the legacy backoff procedure on its associated STAs. In at least one variation, it is possible to reuse this element to set the EDCA parameters for a non-zero backoff procedure.

Figure 18:
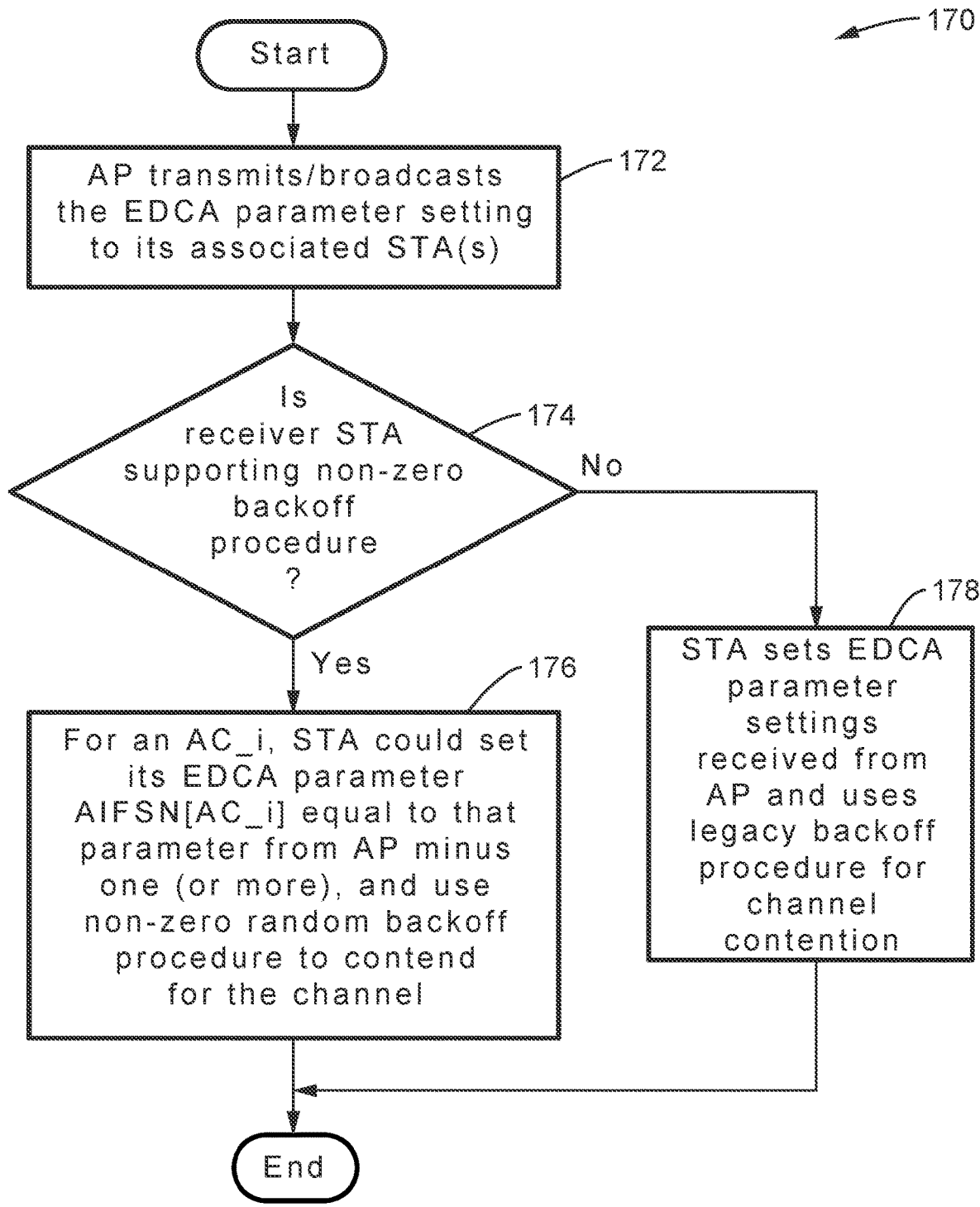
FIG. 18 is a flow diagram of an AP sending the EDCA parameter set element to its associated STAs according to at least one example of the present disclosure.

FIG. 18 illustrates an example embodiment 170 of an AP sending the EDCA parameter set element to its associated STAs. The purpose exemplified here is that of letting the AP send the same EDCA parameter setting that could be used for EDCA parameter setting for both the non-zero backoff procedure and the legacy backoff procedure on its associated STAs.

The AP first transmits or broadcasts 172 a frame including the EDCA parameter setting, e.g., EDCA parameter set element, to its associated STAs. A check 174 is performed to determine, if the receiver STA supports a non-zero backoff procedure. If the non-zero backoff is supported then at block 176, the STA sets its EDCA parameter AIFSN[AC_i] (i.e., the AIFSN for AC_i) equal to that parameter from AP minus one or more, and can use non-zero random backoff procedure to contend for the channel. For example, the AIFSN [AC_VO] is 2 in the EDCA parameter set element from AP. Then, the STA sets the AIFSN[AC_VO] to 1 for a non-zero backoff procedure for AC_VO. The rest of the parameters for that AC_i can be set the same as those from the AP or adjusted similar as AIFSN.

Otherwise, if it is determined at block 174 that the receiver STA does not support a non-zero backoff procedure, or it decides not to use the non-zero backoff procedure, then at block 178 it uses the same EDCA parameter setting as they are set in the EDCA parameter set element from AP.

It should be noted that it is possible that the STA decides which EDCAFs use non-zero backoff procedure and/or which time an EDCAF uses a non-zero backoff procedure. Alternatively, the STA sends information to inform the AP that it supports non-zero backoff procedure, and the AP can make a determination for the STA whether to use non-zero backoff procedure or not. This decision can also be made either by the AP only, or negotiated between the AP and the STA. It will be noted that the supporting of non-zero backoff procedure can be a capability of a STA while a non-AP STA can send this capability information with other capability information of the non-AP STA to an AP.

Figure 19:
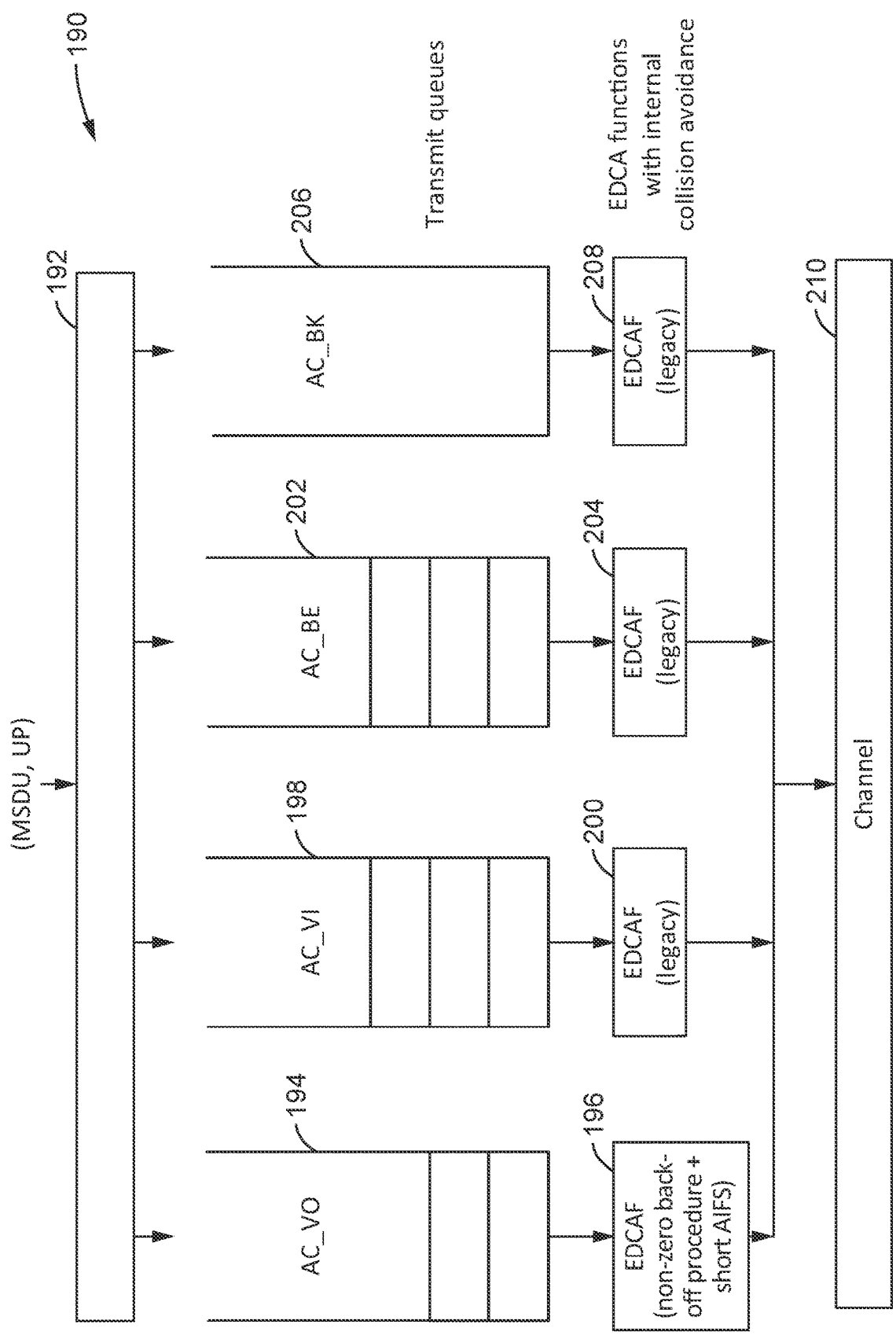
FIG. 19 is a queue diagram of EDCA queues in which a STA uses some EDCAFs for non-zero backoff procedures and other EDCAFs for legacy backoff procedures according to at least one example of the present disclosure.

FIG. 19 illustrates an example embodiment 190 in which an EDCA system of a STA uses some EDCAFs for a non-zero backoff procedure and other EDCAFs for a legacy backoff procedure, for accessing Channel 210. For a MAC Service Data Unit (MSDU) or User Priority (UP) 192, the AC queues are shown as AC_VO 194, AC_VI 198, AC_BE 202 and AC_BK 206. As shown in the figure, the AC_VO EDCAF 196 uses a non-zero backoff procedure with short AIFS while the EDCAFs 200, 204 and 208 of the other ACs use a legacy backoff procedure. In at least one implementation the STA can use the parameters from the EDCA parameter set element as received from the AP, which is shown as in Table 3.

It should be noted that in at least one embodiment the STA determines which EDCAFs will use non-zero backoff procedures and/or which time periods that an EDCAF will use a non-zero backoff procedure. Alternatively, this determination can be performed by the AP only, or a determination negotiated between the AP and the STA.

Table 3 shows an example of using the same EDCA parameter set element to set the parameters for both legacy backoff procedure and non-zero backoff procedure.

For those legacy STAs not supporting the non-zero backoff procedure, they should set the same EDCA parameters as are set in the EDCA parameter set element received from the AP.

For those STAs supporting a non-zero backoff procedure, if the EDCAF of an AC is enabled to use non-zero backoff procedure, it can set AIFSN of that AC to a value less than that in the received EDCA parameter set element. As shown in the table, the AIFSN of AC_VO is set to 1 which is less than that in the EDCA parameter set element (i.e., 2). For the EDCAFs of the other ACs, if the non-zero backoff procedure is not enabled, the EDCA parameters of those ACs should be the same as they are in the EDCA parameter set element. It will be noted that in at least one embodiment CWmin and CWmax can utilize predetermined integers.

5.4.1.2. New EDCA Parameter Set Element for Non-zero Backoff

In at least one embodiment a new EDCA parameter set element can be defined to set the parameters for non-zero backoff procedure. The new EDCA parameter set element for the non-zero backoff procedure can be set similar to FIG. 22 and it can be carried by a frame similar to that described in FIG. 21. The AP can send or broadcast a frame similar to FIG. 21 to set the EDCA parameters for a legacy backoff procedure and for a non-zero backoff procedure separately.

Figure 20:
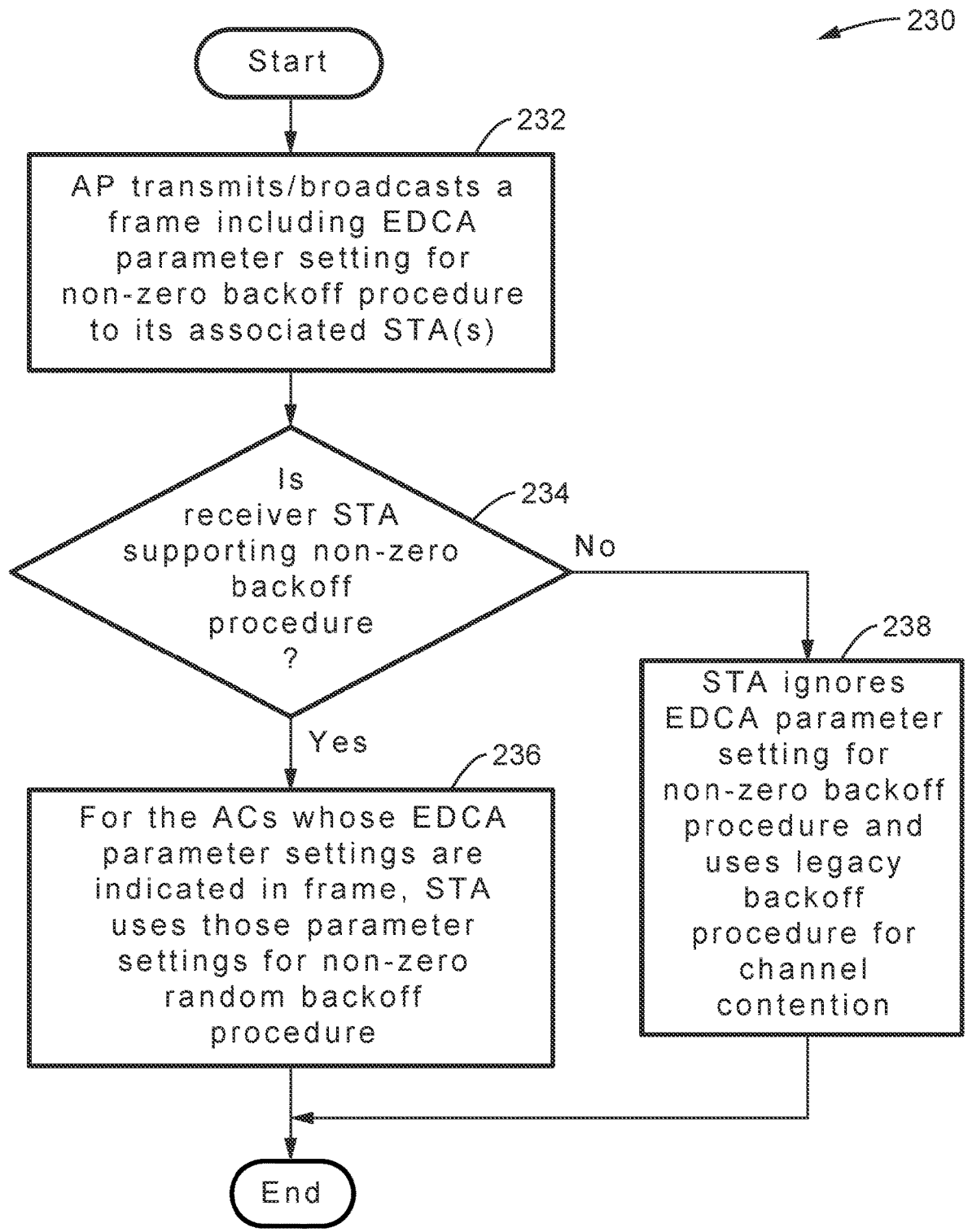
FIG. 20 is a flow diagram of using a new EDCA parameter set element to set the parameters for non-zero backoff procedures according to at least one example of the present disclosure.

FIG. 20 illustrates an example embodiment 230 of using a new EDCA parameter set element to set the parameters for non-zero backoff procedure. The AP transmits or broadcasts 232 a frame including the EDCA parameter setting for the legacy backoff procedure (e.g., EDCA parameter set element) and the EDCA parameter setting for the non-zero backoff procedure (e.g., non-zero backoff EDCA parameter set element) separately.

A check 234 determines, if the receiver STA supports a non-zero backoff procedure. If it is a legacy STA, then in block 238 it ignores the EDCA parameter setting for the non-zero backoff procedure.

If, however, the receiver STA supports a non-zero backoff procedure, then in block 236 it uses the EDCA parameter setting for the non-zero backoff procedure in the received frame. It will be noted that when a STA receives the EDCA parameter setting of an AC for the non-zero backoff procedure from AP, the choice can be either mandatory or optional on whether the STA enables the non-zero backoff procedure for that AC. When a STA uses EDCA parameter settings of an AC for the non-zero backoff procedure, it may ignore the EDCA parameter setting of that AC for the legacy backoff procedure in the received frame. Note that a STA may enable or disable non-zero backoff procedure by time.

Figure 21:
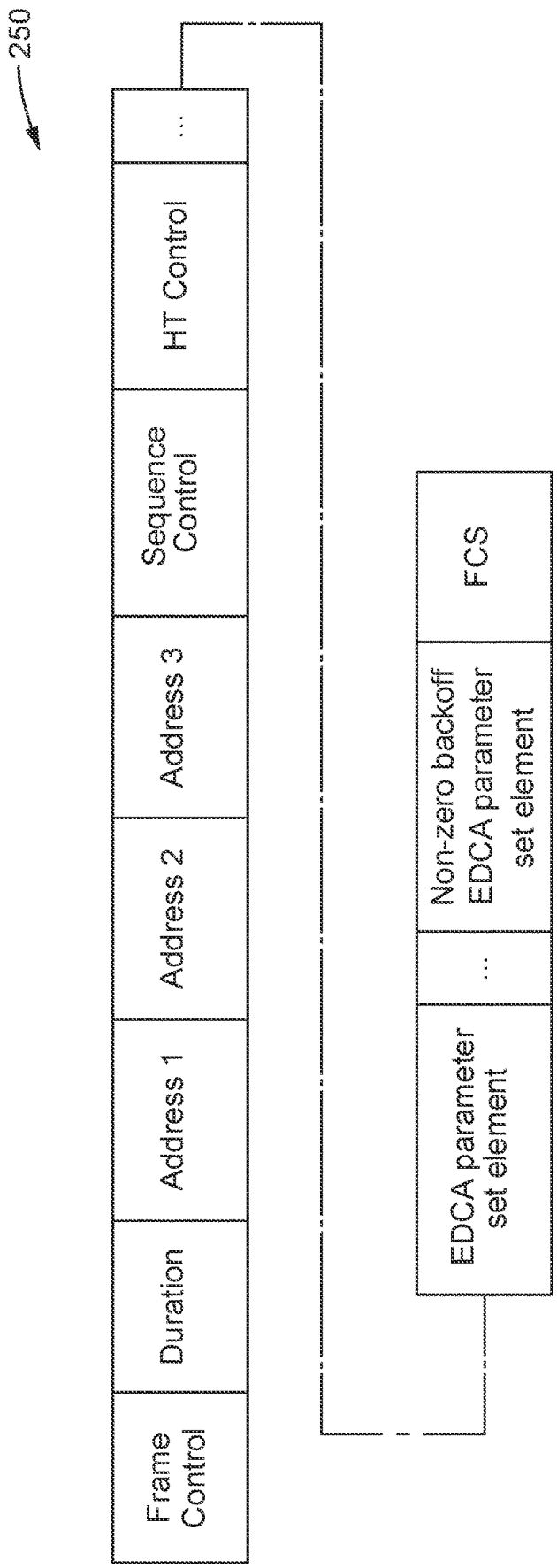
FIG. 21 is a data field diagram of a frame which includes EDCA parameter setting for non-zero backoff and legacy backoff procedures separately according to at least one example of the present disclosure.

FIG. 21 illustrates an example embodiment 250 of a frame which includes EDCA parameter settings for the non-zero backoff procedure and legacy backoff procedure separately. A Frame Control field indicates the type of frame. A Duration field contains NAV information used for CSMA/CA channel access. Address 1 field contains an address for the recipient of the frame. Address 2 field contains the address of the STA that transmitted the frame. Address 3 field contains the BSSID of the BSS of the recipient. A Sequence control field indicates the sequence number of the frame. An HT control field indicates the extra control information for the frames.

An EDCA parameter set element is configured to allow the AP to set this field to indicate the EDCA parameter setting for the legacy backoff procedure. When the STA receives this field, it can use the parameters in the field for a legacy backoff procedure. A Non-zero backoff EDCA parameter set element is configured to allow the AP to set this field to indicate the EDCA parameter setting for the non-zero backoff procedure. When a STA receives this field, it can use the parameters in the field for a non-zero backoff procedure. One example format of this field is shown in FIG. 22.

Figure 22:
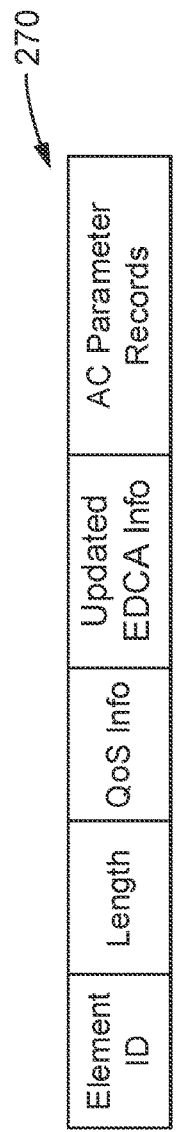
FIG. 22 is a data field diagram of a non-zero backoff EDCA parameter set according to at least one example of the present disclosure.

FIG. 22 illustrates an example embodiment 270 of a non-zero backoff EDCA parameter set parameter. An Element ID and Element ID extension fields provide identification of the element to indicate this element is non-zero backoff EDCA parameter set element. A Length field indicates the length of the element. A QoS Info field can be defined and configured to operate as in IEEE 802.11 as per FIG. 10. An Updated EDCA Info field can be defined and utilized as it is in IEEE 802.11 as shown in FIG. 10.

An AC Parameter Records field carries multiple AC Parameter Record fields as shown in FIG. 11. When the AC Parameter Record of an AC is included in the field, then this indicates that the AP allows the receiver STA to use a non-zero backoff procedure for that AC. The STA can be set in this field for either performing this non-zero backoff procedure for the ACs in a mandatory or optional manner. If the STA enables the non-zero backoff procedure for an AC indicated in this field, it sets the same parameters of that AC as in the corresponding AC Parameter Record for the non-zero backoff procedure.

Figure 23:
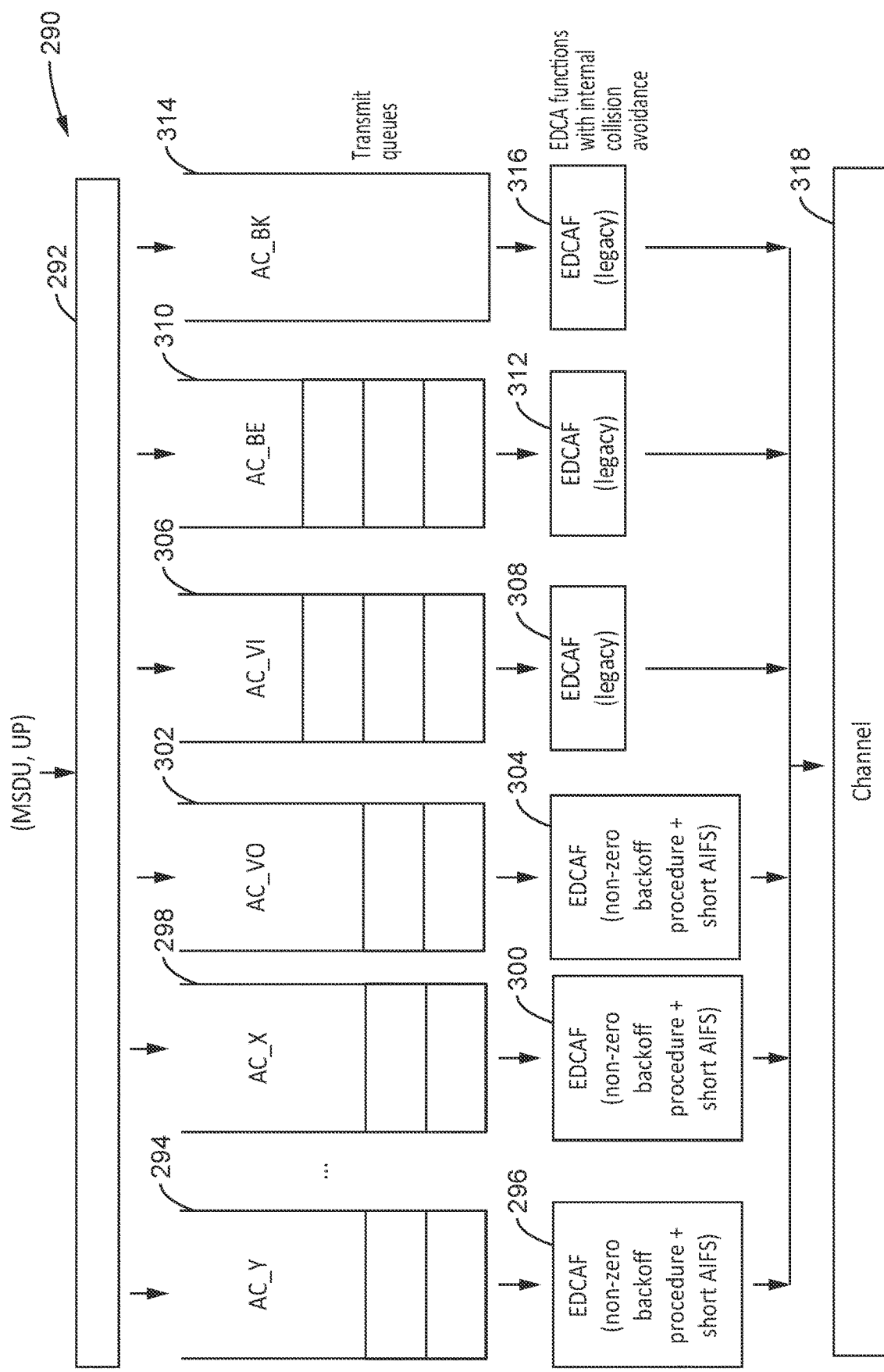
FIG. 23 is a queue diagram of an EDCA system of a STA using EDCAFs for non-zero backoff procedures and other EDCAFs for legacy backoff procedure according to at least one example of the present disclosure showing ACs and EDCA functions.

FIG. 23 illustrates an example embodiment 290 of an EDCA system of a STA using EDCAFs for non-zero backoff procedure and other EDCAFs for legacy backoff procedure. For a MAC Service Data Unit (MSDU) or User Priority (UP) 292, the AC queues are depicted for AC_Y 294, AC_X 298, AC_VO 302, AC_VI 306, AC_BE 310 and AC_BK 314. As shown in the figure, the EDCAFs 296, 300 and 304 of selected AC, exemplified as AC_Y, AC_X and AC_VO uses the non-zero backoff procedure with short AIFS while the EDCAFs 308, 312 and 316 of the other ACs use legacy backoff procedures to obtain channel access 318. The STA can use the parameters from the EDCA parameter set element as received from the AP for the legacy backoff procedure and the parameters from the non-zero backoff EDCA parameter set element received from AP for the non-zero backoff procedure, such as is shown as in Table 4.

In at least one implementation, the STA can determine (decide) which EDCAFs are to use a non-zero backoff procedure and/or which time periods that an EDCAF is to use the non-zero backoff procedure. Alternatively, this decision can be made by the AP acting alone or a decision negotiated between the AP and the STA.

It should also be noted that it is possible that when a STA decides to use non-zero backoff procedure, the EDCAFs of all the ACs of this STA should use non-zero backoff procedures.

Table 4 shows an example of using the EDCA parameter set element to set the parameters for legacy backoff procedure and using the non-zero backoff EDCA parameter set element to set the parameters for a non-zero backoff procedure.

For those legacy STAs not supporting non-zero backoff procedure, they should set the EDCA parameters as they are set in the EDCA parameter set element received from AP.

For those STAs supporting non-zero backoff procedure, if the EDCAF of an AC is enabled to use non-zero backoff procedure, it should use the same parameters of that AC as in the received non-zero backoff EDCA parameter set element. As shown in the table, the AIFSN of AC X is set to 3, CWmin to (aCWmin+1)/4−1, CWmax to (aCWmin+1)/2−1, TXOP limit to 2 ms. It will be noted that aCWmin and aCWmax can be predetermined integers.

5.4.2. Examples

Figure 24:
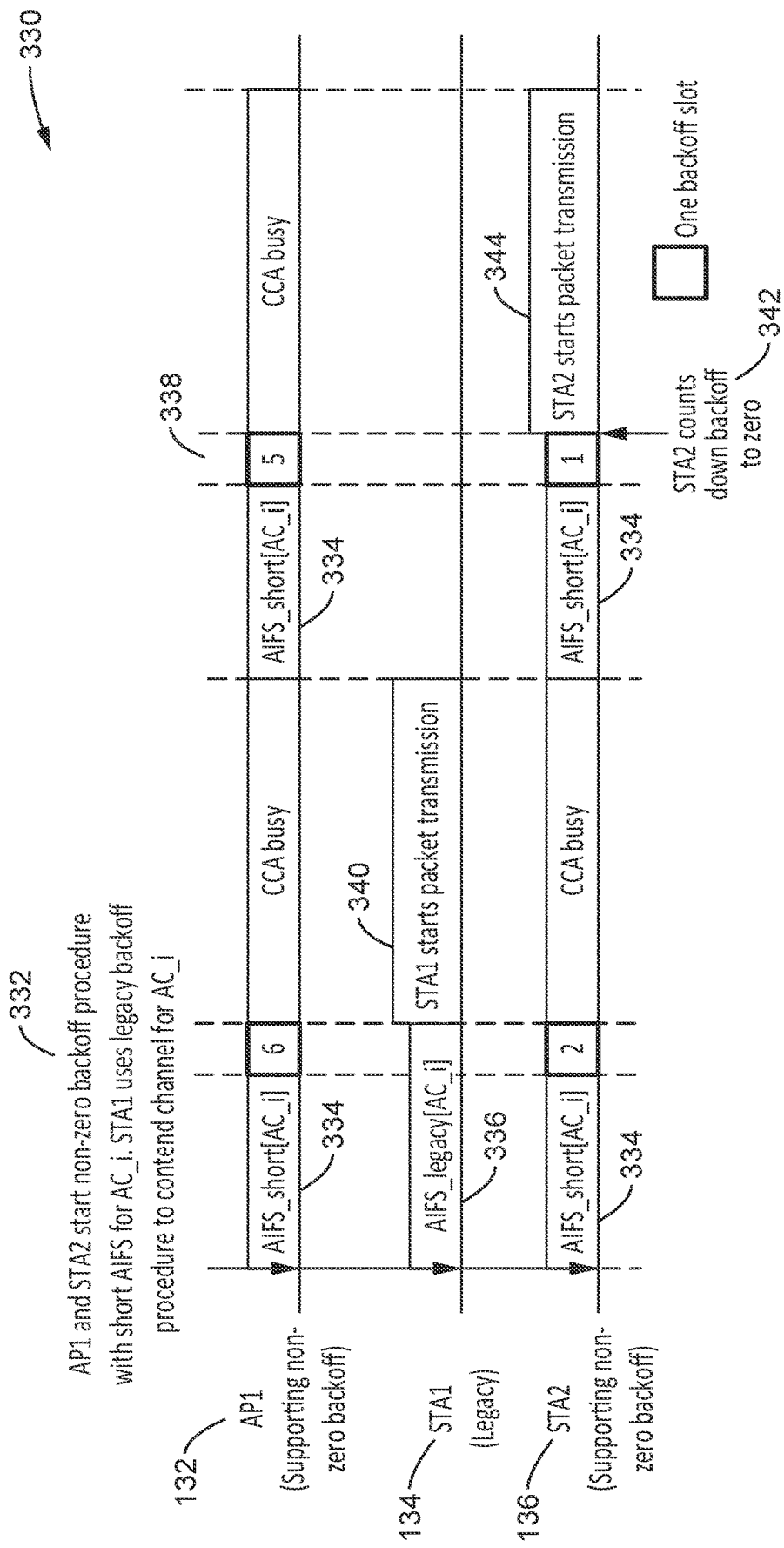
FIG. 24 is a communications diagram of a STA using a shorter Arbitration Inter-Frame Spacing (AIFS) time than that used for a legacy STA using a non-zero backoff procedure for the same AC according to at least one example of the present disclosure.

FIG. 24 illustrates an example embodiment 330 of a STA using shorter AIFS for a non-zero backoff than that used for a legacy STA procedure of the same AC. The figure illustrates coexistence of non-zero backoff procedure and legacy backoff procedure. The network topology is shown in FIG. 14, and depicts AP1 132, STA1 134 and STA2 136. In the example, AP1 and STA2 start non-zero backoff procedures 334 for AC_i while STA1 uses a legacy backoff procedure 336 for AC_i.

The STAs first wait an AIFS time before counting down the backoff 338. The AIFS of AC_i of STA1 is one backoff slot time longer than that of AP1 and STA2. Thus, AP1 and STA2 end the AIFS time of AC_i earlier than STA1 and starts/continues counting down the backoff slots. This gives the non-zero backoff procedure higher probability of accessing the channel earlier (i.e., higher priority) than the legacy backoff procedure for AC_i, especially when the two backoff procedures share the same CW to generate random backoff slots. This can also ensure that each time AP1 and STA2 enter CCA busy (or medium busy) after starting counting down backoff slots, the backoff counter is decreased by at least one.

However, as shown in this example, STA1 is allowed to immediately access the channel and start packet transmission 340 after its AIFS of AC_i according to the legacy backoff procedure. This demonstrates that it is still possible that the STAs using legacy backoff procedure can sometimes obtain channel access earlier than the STAs using the non-zero backoff procedure. Even in such a scenario, it is guaranteed that AP1 and STA2 count down their backoff count by at least one before entering CCA busy. It should be noted that the AIFS time of AC_i of STA1 can be multiple backoff slots time longer than that of AP1 and STA2. It is seen in the right side of the figure that after STA1 completes its transmission then AP1 and STA2 after a short AIFS continue backoffs 338, and in this case STA2 counts down to zero 342 first and obtains the channel and starts packet transmission 344.

Figure 25:
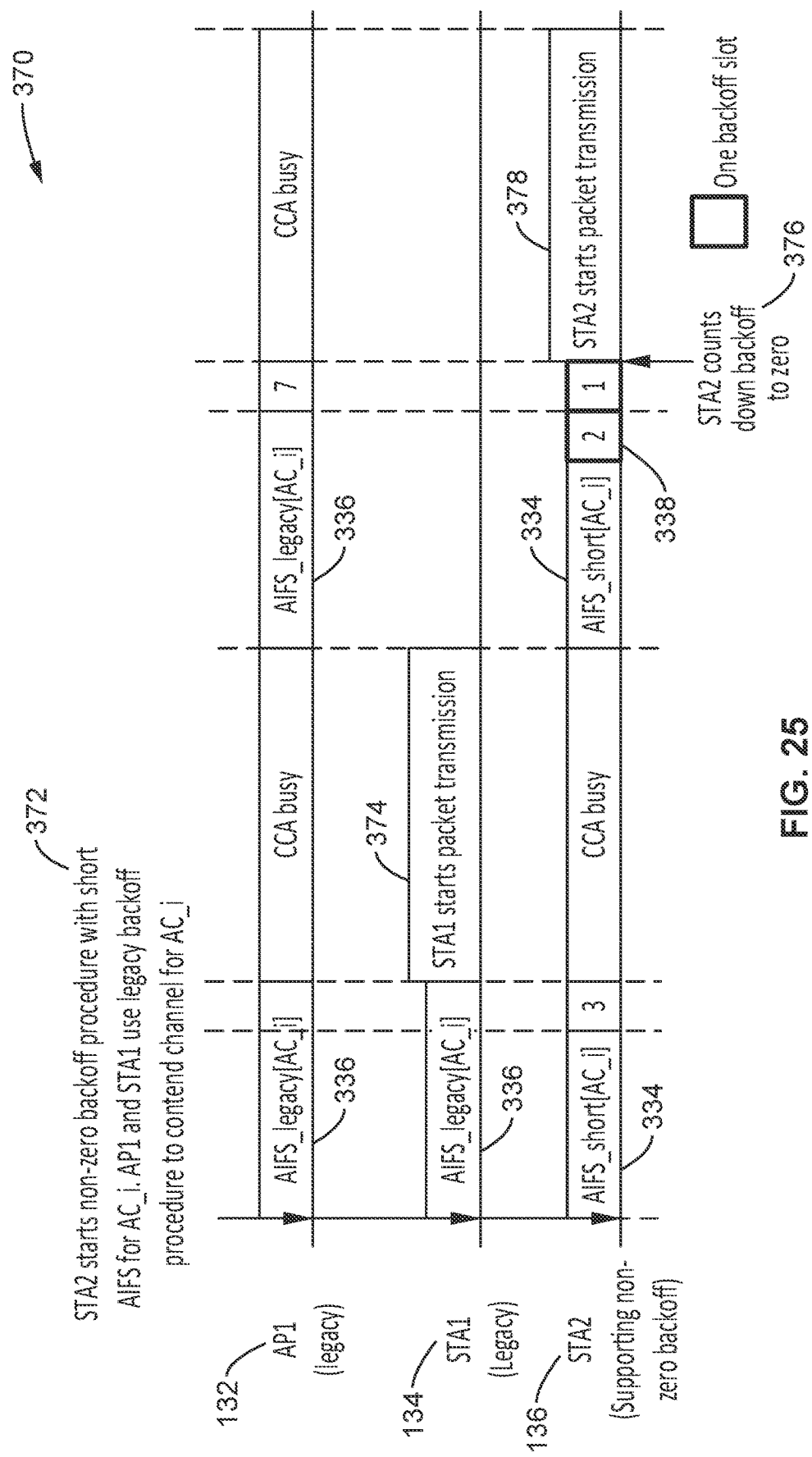
FIG. 25 is a communications diagram showing another example of a STA using a shorter AIFS time than the legacy STA for the non-zero backoff procedures of the same AC according to at least one example of the present disclosure.

FIG. 25 illustrates an example embodiment 370 of a STA using a shorter AIFS than the legacy STA for the non-zero backoff procedures of a same AC. The figure shows another example of coexistence of non-zero backoff procedure and legacy backoff procedure. The network topology is shown in FIG. 14, and depicts the same STAs as in FIG. 24.

In the example, STA2 starts 372 a non-zero backoff procedure using a short AIFS 334 for AC_i. AP1 and STA1 use a legacy backoff procedure for AC_i with a legacy AIFS 336. Compared with the example shown in FIG. 24, this example shows that it is possible that a STA supporting non-zero backoff procedure can associate with a legacy AP and still use the non-zero backoff procedure. In this example, the EDCA parameter setting for the non-zero backoff procedure can be the same or similar to that described in FIG. 18.

The STAs first wait an AIFS time before counting down the backoff. The AIFSs of AC_i of AP1 and STA1 using a legacy AIFS which is one backoff slot time longer than that of STA2 which starts a non-zero backoff procedure with short AIFS for AC_i 372. Thus, STA2 should end the AIFS time of AC_i earlier than STA1 and start/continue to count down the backoff slots. This gives the non-zero backoff procedure higher possibility to access the channel earlier (i.e., higher priority) than the legacy backoff procedure for AC_i, especially when the two backoff procedures share the same CW to generate random backoff slots. This can also ensure that every time STA2 enters CCA busy (or medium busy) after starting counting down backoff slots, the backoff counter is decreased by at least one.

However, as shown in this example, STA1 is allowed to immediately access the channel and start packet transmission 374 after its AIFS of AC_i due to the rule of the legacy backoff procedure. Thus it is seen that it is still possible that the STAs using a legacy backoff procedure can access the channel earlier than the STAs using non-zero backoff procedure. It will be noted that the AIFS time of AC_i of STA1 can be multiple backoff slots spanning a time longer than that of AP1 and STA2.

After STA1 performs its transmission, STA2 is seen performing a short AIFS 334 and starting to count down 338, while AP1 uses the legacy AIFS 336 which takes longer. STA2 is first to count down the backoff to zero 376 and start its packet transmission 378.

6. General Scope of Implementations

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless communication circuit, as a wireless station (STA) as either an Access Point (AP) or a non-AP STA, is configured for wirelessly communicating over a channel with other wireless stations (STAs), which are either APs or non-AP STAs, on a wireless local area network (WLAN) in which packets carry frames; (b) a processor coupled to said wireless communication circuit for operating on the WLAN as a STA; (c) a non-transitory memory storing instructions executable by the processor for communicating with other STAs; and (d) wherein said instructions, when executed by the processor, perform one or more steps comprising: (d)(i) initiating a non-zero backoff procedure by setting a backoff counter to a random value greater than or equal to at least one backoff slot in starting to contend for a channel; (d)(ii) counting down said backoff counter depending on channel conditions; and (d)(iii) accessing the channel when the backoff counter reaches zero.

An apparatus for wireless communication in a network, the apparatus comprising: (a) a wireless communication circuit, as a wireless station (STA) operating as either an Access Point (AP) or a non-AP STA, is configured for wirelessly communicating over a channel with other wireless stations (STAs), which are either APs or non-AP STAs, on a wireless local area network (WLAN) in which packets carry frames; (b) a processor coupled to said wireless communication circuit for operating on the WLAN as a STA; (c) a non-transitory memory storing instructions executable by the processor for communicating with other STAs; and (d) wherein said instructions, when executed by the processor, perform one or more steps comprising: (d)(i) utilizing non-zero backoff procedures for channel contention when said STA supports non-zero backoff procedure, and utilizing legacy backoff procedure for channel contention when said STA does not support non-zero backoff procedures; and (d)(ii) setting an AIFS time for an AC shorter, as a short AIFS time, when using a non-zero backoff procedure, than the length of an AIFS time utilized for that AC when using the legacy backoff procedure toward providing said non-zero backoff procedure with a higher probability of accessing the channel earlier than STAs using said legacy backoff procedure.

A method of wireless communication in a network, comprising: (a) performing wireless communications from a wireless station (STA) operating as either an Access Point (AP) or a non-AP STA to other wireless stations (STAs), which are either APs or non-AP STAs, on a wireless local area network (WLAN) in which packets carry frames; (b) initiating a non-zero backoff procedure by setting a backoff counter to a random value greater or equal to at least one backoff slot in starting to contend for a channel; (c) counting down said backoff counter depending on channel conditions; and (d) accessing the channel when the backoff counter reaches zero.

A wireless communication apparatus performing transmission of packets, where CSMA/CA or EDCA is applied and packets carry frames, comprising: STAs not supporting non-zero backoff procedure uses legacy backoff procedure for channel contention; STAs supporting non-zero backoff procedure could use non-zero backoff procedure for channel contention; and STAs using non-zero backoff procedure for an AC could set the AIFS time of that AC shorter than that used by STAs using legacy backoff procedure for the same AC to let non-zero backoff procedure has higher possibility to access channel earlier.

A wireless communication apparatus performing transmission of packets, where CSMA/CA or EDCA is applied and packets carry frames, comprising: a STA initiates a non-zero backoff counter to a random value greater or equal to 1 (at least one backoff slot); STA counts down the backoff counter depending on the channel condition; and STA accesses the channel when the backoff counter equal to 0.

The apparatus or method of any preceding implementation, wherein the STA is configured for using either said non-zero backoff procedure for an Access Class (AC), or a legacy backoff procedure which is not using the non-zero backoff procedure.

The apparatus or method of any preceding implementation, wherein a STA using said non-zero backoff procedure for an Access Class (AC) sets an Arbitration Inter-Frame Spacing (AIFS) time to an amount less than that utilized for a legacy backoff procedure which is not using the non-zero backoff procedure.

The apparatus or method of any preceding implementation, wherein said station operating in the role of an AP reuses an Enhanced DCF Channel Access (EDCA) parameter set by communicating the EDCA parameter set to its associated STAs for setting said non-zero backoff procedure.

The apparatus or method of any preceding implementation, wherein said station operating in the role of an AP performs defining a new element in a communication frame for communicating at least one EDCA parameter set for its associated STAs to set the EDCA parameters for a non-zero backoff procedure.

The apparatus or method of any preceding implementation, wherein said station determines, without the aid of AP input, whether or not to enable a non-zero backoff procedure for one or more Access Classes (ACs).

The apparatus or method of any preceding implementation, wherein said station operating as an AP determines for its associated STAs whether or not to enable non-zero backoff procedures for one or more Access Classes (ACs).

The apparatus or method of any preceding implementation, wherein said station can switch between enabling and disabling said non-zero backoff procedure in different periods of time.

The apparatus or method of any preceding implementation, wherein said station determines, without the aid of AP input, whether or not to enable a non-zero backoff procedure for one or more Access Classes (ACs).

The apparatus or method of any preceding implementation, wherein said station operating as an AP determines for its associated STAs whether or not to enable non-zero backoff procedures for one or more Access Classes (ACs).

The apparatus or method of any preceding implementation, wherein said station operating in the role of an AP reuses an Enhanced DCF Channel Access (EDCA) parameter set by communicating the EDCA parameter set to its associated STAs for setting said non-zero backoff procedure.

The apparatus or method of any preceding implementation, where the STA using non-zero backoff procedure for an AC could set its AIFSN less than that for the legacy backoff procedure.

The apparatus or method of any preceding implementation, where the AP could reuse the EDCA parameter set element to set the EDCA parameters for the non-zero backoff procedure on its associated STAs.

The apparatus or method of any preceding implementation, where the AP could define a new element to set the EDCA parameters for the non-zero backoff procedure on its associated STAs.

The apparatus or method of any preceding implementation, where the STA could decide whether to enable non-zero backoff procedure for an AC by itself.

The apparatus or method of any preceding implementation, where the AP could decide whether to enable non-zero backoff procedure for an AC on its associated STAs.

The apparatus or method of any preceding implementation, where the STA could enable and disable non-zero backoff procedure by time.

The apparatus or method of any preceding implementation, where the STA supporting non-zero backoff procedure could make its own decision of whether to use non-zero backoff procedure for one or more ACs.

The apparatus or method of any preceding implementation, where the AP could mandate its associated STAs supporting non-zero backoff procedure to use non-zero backoff procedure for one or more ACs.

The apparatus or method of any preceding implementation, where the AP could reuse the EDCA parameter set element to set the EDCA parameters for the non-zero backoff procedure on its associated STAs.

The apparatus or method of any preceding implementation, where the AP could define a new element to set the EDCA parameters for the non-zero backoff procedure on its associated STAs.

The apparatus or method of any preceding implementation, where the STA setting short AIFS for the non-zero backoff procedure for an AC could not set the AIFS time shorter than PIFS time.

The apparatus or method of any preceding implementation, where the STA could enable and disable non-zero backoff procedure by time.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

UP-to-AC Mapping

| Priority | User Priority (UP) | 802.1D designation | Transmit queue | AC |
|---|---|---|---|---|
| Low | 1 | Background (BK) | BK | BK |
| ↓ | 2 | Spare (—) | BK | BK |
|  | 0 | Best Effort (BE) | BE | BE |
|  | 3 | Excellent Effort (EE) | BE | BE |
|  | 4 | Control Load (CL) | A_VI | VI |
|  | 5 | Video (VI) | VI | VI |
|  | 6 | Voice (VO) | VO | VO |
| High | 7 | Network Control (NC) | A_VO | VO |

TABLE 2

Example of Default Parameter Set

| AC | CWmin | CWmax | AIFSN | TXOP limit |
|---|---|---|---|---|
| BK | 15 | 1023 | 7 | 0 |
| BE | 15 | 1023 | 3 | 0 |
| VI | 7 | 15 | 2 | 3 ms |
| VO | 3 | 7 | 2 | 1.5 ms |

TABLE 3

Example: AP sending same EDCA parameter settings to associated STAs

EDCA parameter set element & legacy STAs

| AC | AIFSN | CWmin | CWmax | TXOP limit |
|---|---|---|---|---|
| VO | 2 | (aCWmin + 1)/4 − 1 | (aCWmin + 1)/2 − 1 | 3 ms |
| VI | 2 | (aCWmin + 1)/2 − 1 | aCWmin | 6 ms |
| BE | 3 | aCWmin | aCWmax | 3 ms |
| BK | 7 | aCWmin | aCWmax | 3 ms |

STAs supporting non-zero backoff procedure

| AC | AIFSN | CWmin | CWmax | TXOP limit | NZ backoff |
|---|---|---|---|---|---|
| VO | 1 | (aCWmin + 1)/4 − 1 | (aCWmin + 1)/2 − 1 | 3 ms | Yes |
| VI | 2 | (aCWmin + 1)/2 − 1 | aCWmin | 6 ms | No |
| BE | 3 | aCWmin | aCWmax | 3 ms | No |
| BK | 7 | aCWmin | aCWmax | 3 ms | No |

TABLE 4

Example: AP sending same EDCA parameter settings to associated STAs

EDCA parameter set element and legacy STAs

| AC | AIFSN | CWmin | CWmax | TXOP limit |
|---|---|---|---|---|
| X |  |  |  |  |
| Y |  |  |  |  |
| VO | 2 | (aCWmin + 1)/4 − 1 | (aCWmin + 1)/2 − 1 | 3 ms |
| VI | 2 | (aCWmin + 1)/2 − 1 | aCWmin | 6 ms |
| BE | 3 | aCWmin | aCWmax | 3 ms |
| BK | 7 | aCWmin | aCWmax | 3 ms |

STAs supporting NZ backoff (AC_X and AC_Y are new EDCAFs)

| AC | AIFSN | CWmin | CWmax | TXOP limit | NZ backoff |
|---|---|---|---|---|---|
| X | 3 | (aCWmin + 1)/4 − 1 | (aCWmin + 1)/2 − 1 | 2 ms | Yes |
| Y | 5 | (aCWmin + 1)/4 − 1 | (aCWmin + 1)/2 − 1 | 1 ms | Yes |
| VO | 1 | (aCWmin + 1)/4 − 1 | (aCWmin + 1)/2 − 1 | 3 ms | Yes |
| VI | 2 | (aCWmin + 1)/2 − 1 | aCWmin | 6 ms | No |
| BE | 3 | aCWmin | aCWmax | 3 ms | No |
| BK | 7 | aCWmin | aCWmax | 3 ms | No |

What is claimed is:

1. An apparatus for wireless communication in a network, the apparatus comprising:

(a) a wireless communication circuit, as a wireless station (STA) as either an Access Point (AP) or a non-AP STA, is configured for wirelessly communicating over a channel with other wireless stations (STAs), which are either APs or non-AP STAs, on a wireless local area network (WLAN) in which packets carry frames;

(b) a processor coupled to said wireless communication circuit for operating on the WLAN as a STA;

(c) a non-transitory memory storing instructions executable by the processor for communicating with other STAs; and (d) wherein said instructions, when executed by the processor, perform one or more steps comprising:
  (i) initiating a non-zero backoff procedure by setting a backoff counter to a random value greater than or equal to at least one backoff slot in starting to contend for a channel;
  (ii) counting down said backoff counter depending on channel conditions;
  (iii) accessing the channel when the backoff counter reaches zero; and
  (iv) wherein a STA using said non-zero backoff procedure for an Access Class (AC) sets an Arbitration Inter-Frame Spacing (AIFS) time to an amount less than that utilized for a legacy backoff procedure which is not using the non-zero backoff procedure.

2. The apparatus of claim 1, wherein the STA is configured for operating under IEEE 802.11.

3. The apparatus of claim 1, wherein the STA is configured for using said non-zero backoff procedure with Carrier Sense Multiple Access/Collision Avoidance (CSMA/CA), distributed coordination function (DCF) and/or Enhanced DCF Channel Access (EDCA).

4. The apparatus of claim 1, wherein the STA is configured for using either said non-zero backoff procedure for an Access Class (AC), or a legacy backoff procedure which is not using the non-zero backoff procedure.

5. An apparatus for wireless communication in a network, the apparatus comprising:
  (a) a wireless communication circuit, as a wireless station (STA) operating as either an Access Point (AP) or a non-AP STA, is configured for wirelessly communicating over a channel with other wireless stations (STAs), which are either APs or non-AP STAs, on a wireless local area network (WLAN) in which packets carry frames;
  (b) a processor coupled to said wireless communication circuit for operating on the WLAN as a STA;
  (c) a non-transitory memory storing instructions executable by the processor for communicating with other STAs; and
  (d) wherein said instructions, when executed by the processor, perform one or more steps comprising:
    (i) utilizing non-zero backoff procedures for channel contention when said STA supports non-zero backoff procedure, and utilizing legacy backoff procedure for channel contention when said STA does not support non-zero backoff procedures;
    (ii) setting an AIFS time for an AC shorter, as a short AIFS time, when using a non-zero backoff procedure, than the length of an AIFS time utilized for that AC when using the legacy backoff procedure toward providing said non-zero backoff procedure with a higher probability of accessing the channel earlier than STAs using said legacy backoff procedure; and
    (iii) wherein said station determines, without the aid of AP input, whether or not to enable a non-zero backoff procedure for one or more Access Classes (ACs).

6. The apparatus of claim 5, wherein the STA is configured for operating under IEEE 802.11.

7. The apparatus of claim 5, wherein the STA is configured for using said non-zero backoff procedure with Carrier Sense Multiple Access/Collision Avoidance (CSMA/CA), distributed coordination function (DCF) and/or Enhanced DCF Channel Access (EDCA).

8. A method of wireless communication in a network, comprising:
  (a) performing wireless communications from a wireless station (STA) operating as either an Access Point (AP) or a non-AP STA to other wireless stations (STAs), which are either APs or non-AP STAs, on a wireless local area network (WLAN) in which packets carry frames;
  (b) initiating a non-zero backoff procedure by setting a backoff counter to a random value greater than or equal to at least one backoff slot in starting to contend for a channel;
  (c) counting down said backoff counter depending on channel conditions;
  (d) accessing the channel when the backoff counter reaches zero; and
  (e) further comprising utilizing said non-zero backoff procedures for channel contention when said STA supports non-zero backoff procedures, and utilizing legacy backoff procedures for channel contention when said STA does not support non-zero backoff procedures.

9. An apparatus for wireless communication in a network, the apparatus comprising:
  (a) a wireless communication circuit, as a wireless station (STA) as either an Access Point (AP) or a non-AP STA, is configured for wirelessly communicating over a channel with other wireless stations (STAs), which are either APs or non-AP STAs, on a wireless local area network (WLAN) in which packets carry frames;
  (b) a processor coupled to said wireless communication circuit for operating on the WLAN as a STA;
  (c) a non-transitory memory storing instructions executable by the processor for communicating with other STAs; and
  (d) wherein said instructions, when executed by the processor, perform one or more steps comprising:
    (i) initiating a non-zero backoff procedure by setting a backoff counter to a random value greater than or equal to at least one backoff slot in starting to contend for a channel;
    (ii) counting down said backoff counter depending on channel conditions;
    (iii) accessing the channel when the backoff counter reaches zero; and
    (iv) wherein said station operating in the role of an AP reuses an Enhanced DCF Channel Access (EDCA) parameter set by communicating the EDCA parameter set to its associated STAs for setting said non-zero backoff procedure.

10. The apparatus of claim 9, wherein the STA is configured for operating under IEEE 802.11.

11. The apparatus of claim 9, wherein the STA is configured for using said non-zero backoff procedure with Carrier Sense Multiple Access/Collision Avoidance (CSMA/CA), distributed coordination function (DCF) and/or Enhanced DCF Channel Access (EDCA).

12. The apparatus of claim 9, wherein the STA is configured for using either said non-zero backoff procedure for an Access Class (AC), or a legacy backoff procedure which is not using the non-zero backoff procedure.

13. An apparatus for wireless communication in a network, the apparatus comprising:
  (a) a wireless communication circuit, as a wireless station (STA) as either an Access Point (AP) or a non-AP STA, is configured for wirelessly communicating over a channel with other wireless stations (STAs), which are either APs or non-AP STAs, on a wireless local area network (WLAN) in which packets carry frames;
(b) a processor coupled to said wireless communication circuit for operating on the WLAN as a STA;
(c) a non-transitory memory storing instructions executable by the processor for communicating with other STAs; and
(d) wherein said instructions, when executed by the processor, perform one or more steps comprising:
  (i) initiating a non-zero backoff procedure by setting a backoff counter to a random value greater than or equal to at least one backoff slot in starting to contend for a channel;
  (ii) counting down said backoff counter depending on channel conditions;
  (iii) accessing the channel when the backoff counter reaches zero; and
  (iv) wherein said station operating in the role of an AP performs defining a new element in a communication frame for communicating at least one EDCA parameter set for its associated STAs to set the EDCA parameters for a non-zero backoff procedure.

14. The apparatus of claim 13, wherein the STA is configured for operating under IEEE 802.11.

15. The apparatus of claim 13, wherein the STA is configured for using said non-zero backoff procedure with Carrier Sense Multiple Access/Collision Avoidance (CSMA/CA), distributed coordination function (DCF) and/or Enhanced DCF Channel Access (EDCA).

16. The apparatus of claim 13, wherein the STA is configured for using either said non-zero backoff procedure for an Access Class (AC), or a legacy backoff procedure which is not using the non-zero backoff procedure.

17. An apparatus for wireless communication in a network, the apparatus comprising:
(a) a wireless communication circuit, as a wireless station (STA) as either an Access Point (AP) or a non-AP STA, is configured for wirelessly communicating over a channel with other wireless stations (STAs), which are either APs or non-AP STAs, on a wireless local area network (WLAN) in which packets carry frames;
(b) a processor coupled to said wireless communication circuit for operating on the WLAN as a STA;
(c) a non-transitory memory storing instructions executable by the processor for communicating with other STAs; and
(d) wherein said instructions, when executed by the processor, perform one or more steps comprising:
  (i) initiating a non-zero backoff procedure by setting a backoff counter to a random value greater than or equal to at least one backoff slot in starting to contend for a channel;
  (ii) counting down said backoff counter depending on channel conditions;
  (iii) accessing the channel when the backoff counter reaches zero; and
  (iv) wherein said station determines, without the aid of AP input, whether or not to enable a non-zero backoff procedure for one or more Access Classes (ACs).

18. The apparatus of claim 17, wherein the STA is configured for operating under IEEE 802.11.

19. The apparatus of claim 17, wherein the STA is configured for using said non-zero backoff procedure with Carrier Sense Multiple Access/Collision Avoidance (CSMA/CA), distributed coordination function (DCF) and/or Enhanced DCF Channel Access (EDCA).

20. The apparatus of claim 17, wherein the STA is configured for using either said non-zero backoff procedure for an Access Class (AC), or a legacy backoff procedure which is not using the non-zero backoff procedure.

21. An apparatus for wireless communication in a network, the apparatus comprising:
(a) a wireless communication circuit, as a wireless station (STA) as either an Access Point (AP) or a non-AP STA, is configured for wirelessly communicating over a channel with other wireless stations (STAs), which are either APs or non-AP STAs, on a wireless local area network (WLAN) in which packets carry frames;
(b) a processor coupled to said wireless communication circuit for operating on the WLAN as a STA;
(c) a non-transitory memory storing instructions executable by the processor for communicating with other STAs; and
(d) wherein said instructions, when executed by the processor, perform one or more steps comprising:
  (i) initiating a non-zero backoff procedure by setting a backoff counter to a random value greater than or equal to at least one backoff slot in starting to contend for a channel;
  (ii) counting down said backoff counter depending on channel conditions;
  (iii) accessing the channel when the backoff counter reaches zero; and
  (iv) wherein said station operating as an AP determines for its associated STAs whether or not to enable non-zero backoff procedures for one or more Access Classes (ACs).

22. The apparatus of claim 21, wherein the STA is configured for operating under IEEE 802.11.

23. The apparatus of claim 21, wherein the STA is configured for using said non-zero backoff procedure with Carrier Sense Multiple Access/Collision Avoidance (CSMA/CA), distributed coordination function (DCF) and/or Enhanced DCF Channel Access (EDCA).

24. The apparatus of claim 21, wherein the STA is configured for using either said non-zero backoff procedure for an Access Class (AC), or a legacy backoff procedure which is not using the non-zero backoff procedure.

25. An apparatus for wireless communication in a network, the apparatus comprising:
(a) a wireless communication circuit, as a wireless station (STA) as either an Access Point (AP) or a non-AP STA, is configured for wirelessly communicating over a channel with other wireless stations (STAs), which are either APs or non-AP STAs, on a wireless local area network (WLAN) in which packets carry frames;
(b) a processor coupled to said wireless communication circuit for operating on the WLAN as a STA;
(c) a non-transitory memory storing instructions executable by the processor for communicating with other STAs; and
(d) wherein said instructions, when executed by the processor, perform one or more steps comprising:
  (i) initiating a non-zero backoff procedure by setting a backoff counter to a random value greater than or equal to at least one backoff slot in starting to contend for a channel;
  (ii) counting down said backoff counter depending on channel conditions;
  (iii) accessing the channel when the backoff counter reaches zero; and (iv) wherein said station can switch between enabling and disabling said non-zero backoff procedure in different periods of time.

26. The apparatus of claim 25, wherein the STA is configured for operating under IEEE 802.11.

27. The apparatus of claim 25, wherein the STA is configured for using said non-zero backoff procedure with Carrier Sense Multiple Access/Collision Avoidance (CSMA/CA), distributed coordination function (DCF) and/or Enhanced DCF Channel Access (EDCA).

28. The apparatus of claim 25, wherein the STA is configured for using either said non-zero backoff procedure for an Access Class (AC), or a legacy backoff procedure which is not using the non-zero backoff procedure.

29. An apparatus for wireless communication in a network, the apparatus comprising:
   (a) a wireless communication circuit, as a wireless station (STA) operating as either an Access Point (AP) or a non-AP STA, is configured for wirelessly communicating over a channel with other wireless stations (STAs), which are either APs or non-AP STAs, on a wireless local area network (WLAN) in which packets carry frames;
   (b) a processor coupled to said wireless communication circuit for operating on the WLAN as a STA;
   (c) a non-transitory memory storing instructions executable by the processor for communicating with other STAs; and
   (d) wherein said instructions, when executed by the processor, perform one or more steps comprising:
      (i) utilizing non-zero backoff procedures for channel contention when said STA supports non-zero backoff procedure, and utilizing legacy backoff procedure for channel contention when said STA does not support non-zero backoff procedures;
      (ii) setting an AIFS time for an AC shorter, as a short AIFS time, when using a non-zero backoff procedure, than the length of an AIFS time utilized for that AC when using the legacy backoff procedure toward providing said non-zero backoff procedure with a higher probability of accessing the channel earlier than STAs using said legacy backoff procedure; and
      (iii) wherein said station operating as an AP determines for its associated STAs whether or not to enable non-zero backoff procedures for one or more Access Classes (ACs).

30. The apparatus of claim 29, wherein the STA is configured for operating under IEEE 802.11.

31. The apparatus of claim 29, wherein the STA is configured for using said non-zero backoff procedure with Carrier Sense Multiple Access/Collision Avoidance (CSMA/CA), distributed coordination function (DCF) and/or Enhanced DCF Channel Access (EDCA).

32. An apparatus for wireless communication in a network, the apparatus comprising:
   (a) a wireless communication circuit, as a wireless station (STA) operating as either an Access Point (AP) or a non-AP STA, is configured for wirelessly communicating over a channel with other wireless stations (STAs), which are either APs or non-AP STAs, on a wireless local area network (WLAN) in which packets carry frames;
   (b) a processor coupled to said wireless communication circuit for operating on the WLAN as a STA;
   (c) a non-transitory memory storing instructions executable by the processor for communicating with other STAs; and
   (d) wherein said instructions, when executed by the processor, perform one or more steps comprising:
      (i) utilizing non-zero backoff procedures for channel contention when said STA supports non-zero backoff procedure, and utilizing legacy backoff procedure for channel contention when said STA does not support non-zero backoff procedures;
      (ii) setting an AIFS time for an AC shorter, as a short AIFS time, when using a non-zero backoff procedure, than the length of an AIFS time utilized for that AC when using the legacy backoff procedure toward providing said non-zero backoff procedure with a higher probability of accessing the channel earlier than STAs using said legacy backoff procedure; and
      (iii) wherein said station operating in the role of an AP reuses an Enhanced DCF Channel Access (EDCA) parameter set by communicating the EDCA parameter set to its associated STAs for setting said non-zero backoff procedure.

33. The apparatus of claim 32, wherein the STA is configured for operating under IEEE 802.11.

34. The apparatus of claim 32, wherein the STA is configured for using said non-zero backoff procedure with Carrier Sense Multiple Access/Collision Avoidance (CSMA/CA), distributed coordination function (DCF) and/or Enhanced DCF Channel Access (EDCA).

35. An apparatus for wireless communication in a network, the apparatus comprising:
   (a) a wireless communication circuit, as a wireless station (STA) operating as either an Access Point (AP) or a non-AP STA, is configured for wirelessly communicating over a channel with other wireless stations (STAs), which are either APs or non-AP STAs, on a wireless local area network (WLAN) in which packets carry frames;
   (b) a processor coupled to said wireless communication circuit for operating on the WLAN as a STA;
   (c) a non-transitory memory storing instructions executable by the processor for communicating with other STAs; and
   (d) wherein said instructions, when executed by the processor, perform one or more steps comprising:
      (i) utilizing non-zero backoff procedures for channel contention when said STA supports non-zero backoff procedure, and utilizing legacy backoff procedure for channel contention when said STA does not support non-zero backoff procedures;
      (ii) setting an AIFS time for an AC shorter, as a short AIFS time, when using a non-zero backoff procedure, than the length of an AIFS time utilized for that AC when using the legacy backoff procedure toward providing said non-zero backoff procedure with a higher probability of accessing the channel earlier than STAs using said legacy backoff procedure; and
      (iii) wherein said station operating in the role of an AP performs defining a new element in a communication frame for communicating at least one EDCA parameter set for its associated STAs to set the EDCA parameters for a non-zero backoff procedure.

36. The apparatus of claim 35, wherein the STA is configured for operating under IEEE 802.11.

37. The apparatus of claim 35, wherein the STA is configured for using said non-zero backoff procedure with Carrier Sense Multiple Access/Collision Avoidance (CSMA/CA), distributed coordination function (DCF) and/or Enhanced DCF Channel Access (EDCA).

38. An apparatus for wireless communication in a network, the apparatus comprising:
  (a) a wireless communication circuit, as a wireless station (STA) operating as either an Access Point (AP) or a non-AP STA, is configured for wirelessly communicating over a channel with other wireless stations (STAs), which are either APs or non-AP STAs, on a wireless local area network (WLAN) in which packets carry frames;
  (b) a processor coupled to said wireless communication circuit for operating on the WLAN as a STA;
  (c) a non-transitory memory storing instructions executable by the processor for communicating with other STAs; and
  (d) wherein said instructions, when executed by the processor, perform one or more steps comprising:
    (i) utilizing non-zero backoff procedures for channel contention when said STA supports non-zero backoff procedure, and utilizing legacy backoff procedure for channel contention when said STA does not support non-zero backoff procedures;
    (ii) setting an AIFS time for an AC shorter, as a short AIFS time, when using a non-zero backoff procedure, than the length of an AIFS time utilized for that AC when using the legacy backoff procedure toward providing said non-zero backoff procedure with a higher probability of accessing the channel earlier than STAs using said legacy backoff procedure; and
    (iii) wherein said STA performs setting the short AIFS time for the non-zero backoff procedure for an AC and limiting the short AIFS time to being equal to or larger than a PIFS time.

39. The apparatus of claim 38, wherein the STA is configured for operating under IEEE 802.11.

40. The apparatus of claim 38, wherein the STA is configured for using said non-zero backoff procedure with Carrier Sense Multiple Access/Collision Avoidance (CSMA/CA), distributed coordination function (DCF) and/or Enhanced DCF Channel Access (EDCA).

41. An apparatus for wireless communication in a network, the apparatus comprising:
  (a) a wireless communication circuit, as a wireless station (STA) operating as either an Access Point (AP) or a non-AP STA, is configured for wirelessly communicating over a channel with other wireless stations (STAs), which are either APs or non-AP STAs, on a wireless local area network (WLAN) in which packets carry frames;
  (b) a processor coupled to said wireless communication circuit for operating on the WLAN as a STA;
  (c) a non-transitory memory storing instructions executable by the processor for communicating with other STAs; and
  (d) wherein said instructions, when executed by the processor, perform one or more steps comprising:
    (i) utilizing non-zero backoff procedures for channel contention when said STA supports non-zero backoff procedure, and utilizing legacy backoff procedure for channel contention when said STA does not support non-zero backoff procedures;
    (ii) setting an AIFS time for an AC shorter, as a short AIFS time, when using a non-zero backoff procedure, than the length of an AIFS time utilized for that AC when using the legacy backoff procedure toward providing said non-zero backoff procedure with a higher probability of accessing the channel earlier than STAs using said legacy backoff procedure; and
    (iii) wherein said station can switch between enabling and disabling said non-zero backoff procedure in different periods of time.

42. The apparatus of claim 41, wherein the STA is configured for operating under IEEE 802.11.

43. The apparatus of claim 41, wherein the STA is configured for using said non-zero backoff procedure with Carrier Sense Multiple Access/Collision Avoidance (CSMA/CA), distributed coordination function (DCF) and/or Enhanced DCF Channel Access (EDCA).

44. A method of wireless communication in a network, comprising:
  (a) performing wireless communications from a wireless station (STA) operating as either an Access Point (AP) or a non-AP STA to other wireless stations (STAs), which are either APs or non-AP STAs, on a wireless local area network (WLAN) in which packets carry frames;
  (b) initiating a non-zero backoff procedure by setting a backoff counter to a random value greater than or equal to at least one backoff slot in starting to contend for a channel;
  (c) counting down said backoff counter depending on channel conditions;
  (d) accessing the channel when the backoff counter reaches zero; and
  (e) further comprising setting an AIFS time for an AC shorter, as a short AIFS time, when using a non-zero backoff procedure, than the length of an AIFS time utilized for that AC when using the legacy backoff procedure toward providing said non-zero backoff procedure with a higher probability of accessing the channel earlier than STAs using said legacy backoff procedure.

45. A method of wireless communication in a network, comprising:
  (a) performing wireless communications from a wireless station (STA) operating as either an Access Point (AP) or a non-AP STA to other wireless stations (STAs), which are either APs or non-AP STAs, on a wireless local area network (WLAN) in which packets carry frames;
  (b) initiating a non-zero backoff procedure by setting a backoff counter to a random value greater than or equal to at least one backoff slot in starting to contend for a channel;
  (c) counting down said backoff counter depending on channel conditions;
  (d) accessing the channel when the backoff counter reaches zero; and
  (e) wherein either said station or an AP determines whether or not to enable a non-zero backoff procedure for one or more Access Classes (ACs).

46. A method of wireless communication in a network, comprising:
  (a) performing wireless communications from a wireless station (STA) operating as either an Access Point (AP) or a non-AP STA to other wireless stations (STAs), which are either APs or non-AP STAs, on a wireless local area network (WLAN) in which packets carry frames;
  (b) initiating a non-zero backoff procedure by setting a backoff counter to a random value greater than or equal to at least one backoff slot in starting to contend for a channel;
  (c) counting down said backoff counter depending on channel conditions;

(d) accessing the channel when the backoff counter reaches zero; and
(e) wherein said station can switch between enabling and disabling said non-zero backoff procedure in different periods of time.

* * * * *